US008239298B1

(12) United States Patent
Wilson et al.

(10) Patent No.: US 8,239,298 B1
(45) Date of Patent: Aug. 7, 2012

(54) METHOD AND APPARATUS FOR MANAGING FINANCIAL ACCOUNTS

(76) Inventors: David B. Wilson, Key Largo, FL (US); Frederick C. Buffum, Cohasset, MA (US)

( * ) Notice: Subject to any disclaimer, the term of this patent is extended or adjusted under 35 U.S.C. 154(b) by 1543 days.

(21) Appl. No.: 10/626,885

(22) Filed: Jul. 24, 2003

Related U.S. Application Data

(60) Provisional application No. 60/398,222, filed on Jul. 24, 2002.

(51) Int. Cl.
*G06Q 40/00* (2006.01)
(52) U.S. Cl. .......................................................... 705/35
(58) Field of Classification Search .................... 705/35, 705/1.1
See application file for complete search history.

(56) References Cited

U.S. PATENT DOCUMENTS

| | | | |
|---|---|---|---|
| 4,953,085 A | 8/1990 | Atkins | |
| 5,689,649 A | 11/1997 | Altman et al. | |
| 5,839,118 A | 11/1998 | Ryan et al. | |
| 5,852,811 A * | 12/1998 | Atkins | 705/36 R |
| 5,875,437 A * | 2/1999 | Atkins | 705/40 |
| 5,884,285 A | 3/1999 | Atkins | |
| 5,911,135 A | 6/1999 | Atkins | |
| 6,012,043 A | 1/2000 | Albright et al. | |
| 6,012,044 A | 1/2000 | Maggioncalda et al. | |
| 6,021,397 A | 2/2000 | Jones et al. | |
| 6,055,517 A * | 4/2000 | Friend et al. | 705/36 R |
| 6,064,984 A * | 5/2000 | Ferguson et al. | 705/36 R |
| 6,078,905 A | 6/2000 | Pich-LeWinter | |
| 6,161,098 A * | 12/2000 | Wallman | 705/36 T |
| 6,219,650 B1 * | 4/2001 | Friend et al. | 705/36 R |
| 6,253,192 B1 * | 6/2001 | Corlett et al. | 705/36 R |
| 6,292,787 B1 * | 9/2001 | Scott et al. | 705/36 R |
| 6,601,044 B1 * | 7/2003 | Wallman | 705/36 R |
| 6,799,167 B1 | 9/2004 | Gullen et al. | |
| 6,968,316 B1 * | 11/2005 | Hamilton | 705/36 R |
| 6,985,880 B1 * | 1/2006 | Hodgdon et al. | 705/36 T |
| 7,243,081 B2 * | 7/2007 | Friend et al. | 705/36 R |
| 7,249,080 B1 | 7/2007 | Hoffman et al. | |
| 7,401,040 B2 * | 7/2008 | Sloan et al. | 705/36 R |
| 7,475,032 B1 * | 1/2009 | Patnode et al. | 705/36 R |
| 7,555,451 B2 * | 6/2009 | Rugge et al. | 705/36 R |
| 7,587,363 B2 * | 9/2009 | Cataline et al. | 705/40 |
| 7,647,261 B2 * | 1/2010 | Merton et al. | 705/35 |
| 7,797,207 B1 * | 9/2010 | Dilip et al. | 705/35 |
| 7,818,233 B1 * | 10/2010 | Sloan et al. | 705/36 R |
| 7,831,494 B2 * | 11/2010 | Sloan et al. | 705/36 R |
| 7,895,098 B2 * | 2/2011 | Beard | 705/35 |
| 7,921,048 B2 * | 4/2011 | Sloan et al. | 705/36 R |
| 8,024,213 B1 * | 9/2011 | Fano et al. | 705/7.29 |
| 2001/0051907 A1 | 12/2001 | Kumar et al. | |
| 2002/0013754 A1 | 1/2002 | Frank et al. | |
| 2002/0062272 A1 * | 5/2002 | Kim et al. | 705/36 |
| 2002/0123949 A1 * | 9/2002 | VanLeeuwen | 705/35 |
| 2002/0143682 A1 * | 10/2002 | Bergmann et al. | 705/36 |
| 2003/0028466 A1 * | 2/2003 | Jenson et al. | 705/36 |
| 2003/0120575 A1 | 6/2003 | Wallman | |
| 2004/0015438 A1 * | 1/2004 | Compiano et al. | 705/40 |
| 2005/0097033 A1 | 5/2005 | Pretell et al. | |

OTHER PUBLICATIONS

Brown, Carolyn M, "Using your PC to manage your finances", Black Enterprise, Jul. 1997, v27 n12, pp. 103-106.*
McIntosh, Claire, "The B.E. guide to easy, no-nonsense financial planning", Black Enterprise Oct. 1993, v24 n3, pp. 111-115.*
English, David, Get rich quick! (personal finance, investment and retirement-planning software; includes related information about tax preparation software) (Buyers Guide), Sep. 1994, Compute, v16, n9, pp. 1-5.*
"Retirement Planning", Management Accounting (British), Jan. 1999, v 77, 1 73(1), pp. 1-5.*
Mossberg, Walter, "Despite Flaws, Qucken is best of financial software// New version's helpful debt reduction planner overshadows few problems", Austin American Statesman, Austin, Tex: Dec. 14, 1996. p. D.7.*
Bradbury, James, "Digital Debt Reduction: Use Quicken 2000's Tools to Get out of Debt", MacWorld, Nov. 2000, vol. 17, pp. 76-78.*
Frederick, Jim, "Can these software programs save you from drowing in debt? We put them to the test", Money, May 98, vol. 27, issue 5, p. 139, 4p.*
Weverka, Peter, "Microsoft Money 98 for Dummies", IDG Books Worlwide, Inc, copyright 1997, pp. 1-71.*
Helewitz, Jeffey A, "Understanding statements of net worth", Legal Assistant Today, Sep./Oct. 1998, vol. 16 n1, pp. 76-80.*
Shamah, David, "Zilching your debt", Jerusalem Post. Jerusalem: Aug. 27, 2000, pp. 1-3.*

* cited by examiner

*Primary Examiner* — Ella Colbert
*Assistant Examiner* — Mohammad Z Shaikh
(74) *Attorney, Agent, or Firm* — Lando & Anastasi, LLP

(57) ABSTRACT

Method, system, and computer-readable medium are provided for optimizing an allocation of money to assets and liabilities. A method includes providing at least one asset comprising a value and a projected return rate at which the value is expected to appreciate over a period, providing at least one liability including a liability amount and an interest rate at which the liability amount is expected to depreciate over said period, and optimizing an allocation of money to the at least one asset and the at least one liability based on the expected appreciation of the at least one asset and the expected depreciation of the at least one liability.

57 Claims, 15 Drawing Sheets

FIG. 5

DebtHammer

File  Edit  Options  Help

Current Debt Situation                Mr. and Mrs. Steve Jones

| Liability | Tax Ded | Balance | Int Rate | Monthly Paymt | Interest Expense | Date Paid |
|---|---|---|---|---|---|---|
| National Bank Master Card | no | 5678.37 | 19.9 | 400 | 2824.989074999 | 09-Nov-02 |
| American Bank Visa | no | 4267.32 | 22.3 | 300 | 3172.0412 | 09-Dec-03 |
| National Bank Discover | no | 11548.32 | 23.5 | 450 | 6030.789333333 | 09-Jan-03 |
| My Mortgage - Downtown Trust Co. | yes | 125000 | 9.75 | 1700 | 7169.117647058 | 09-Jan-01 |

146494.01    18.862:    2850.0    19196.93725:    09-Dec-03
Total Debt  Avg Int Rate  Tot Mon Paymt  Tot Int Expense  Debt Free

[Intro] [Enter] [Update] [Delete]

You plan to eliminate your debt        Debt Hammer Optimizer is ON    Apply Tax Savings is OFF

| Liability | Tax Ded | Balance | Rate | Payment | Interest | Date Paid |
|---|---|---|---|---|---|---|
| National Bank Master Card | no | 5678.37 | 19.9 | 400 | 1824.989074999 | 09-Jun-02 |
| American Bank Visa | no | 4267.32 | 22.3 | 300 | 2172.0412 | 09-Jul-03 |
| National Bank Discover | no | 11548.32 | 23.5 | 450 | 5030.789333333 | 09-Aug-02 |
| My Mortgage - Downtown Trust Co. | yes | 125000 | 9.75 | 1700 | 6169.117647058 | 09-Aug-00 |

146494.01    18.862:    2850.0    15196.937253    09-Jul-03
Total Balance  Avg Rate  Total Payment  Total Interest  Debt Free

[Add Payment] [Refinance] [Enter Tax Statistics] [Allocate Savings] [Options]

[View Savings]

FIG. 8

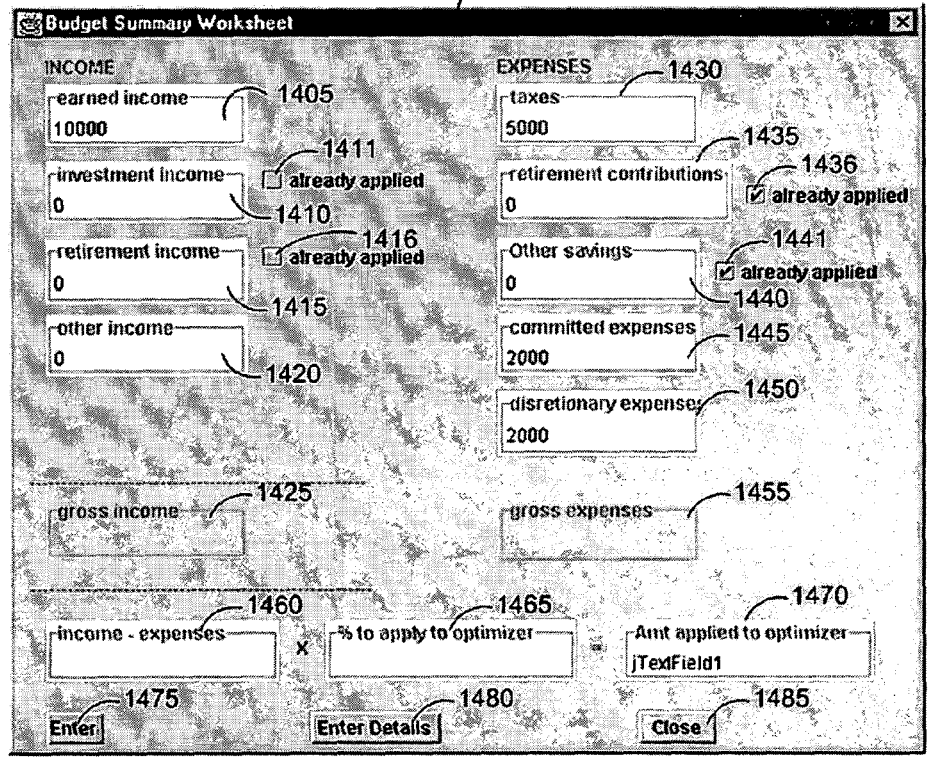

FIG. 16

| Month (1601) | Monthly Cash Flow, all clients (1602) | Fees, at avg rate of 1% (1603) |
|---|---|---|
| 1 | $556,786.00 | $5,567.86 |
| 2 | $556,786.00 | $5,567.86 |
| 3 | $556,786.00 | $5,567.86 |
| 4 | $556,786.00 | $5,567.86 |
| 5 | $556,786.00 | $5,567.86 |
| 6 | $556,786.00 | $5,567.86 |
| 7 | $556,786.00 | $5,567.86 |
| 8 | $556,786.00 | $5,567.86 |
| 9 | $556,786.00 | $5,567.86 |
| 10 | $556,786.00 | $5,567.86 |
| 11 | $556,786.00 | $5,567.86 |
| 12 | $556,786.00 | $5,567.86 |
| Total Annual | $6,681,432.00 (1604) | $66,814.32 (1605) |

METHOD AND APPARATUS FOR MANAGING FINANCIAL ACCOUNTS

FIELD OF THE INVENTION

This invention relates to financial planning, and more particularly to tools used for managing financial accounts.

BACKGROUND OF THE INVENTION

The prior art is replete with software applications designed to assist individuals and organizations with financial management. More particularly, a broad range of off-the-shelf and custom-developed systems exist to help individuals and organizations perform such exemplary financial functions as accounting operations, management of investment portfolios, electronic funds transfer, and the like.

SUMMARY OF THE INVENTION

Given the increasing prevalence of consumer borrowing and credit card accounts, and the resulting increase in the indebtedness of the average American citizen, several software products which help individuals better manage liability (debt) accounts have become very popular. These products include the Quicken Debt Reduction Planner offered by Intuit, Inc., the Money Debt Planner available from the Microsoft Corporation, and the Debt Blaster financial software application available from Zilch, Inc. While these products assist users in tracking financial accounts, they generally leave it to the user (or in the case of some individuals, the user and his/her financial planner) to determine how funds should be allocated across financial accounts in order to maximize net worth over time. Generally, this manual allocation is not optimal.

According to one aspect of the invention, a system and method are provided that optimize fund allocation to debt and investment accounts. In one aspect of the invention, debt and investment are treated as mirrored concepts, and debt and investment accounts are evaluated against one another to determine an optimal allocation based on their anticipated appreciation, and other factors. In one aspect of the invention, a graphical user interface (GUI) is provided which visually integrates debt and investment account performance, so that a user can view the impact of both on overall net worth as modifications are made or assumptions are changed.

One embodiment of the invention provides a computer-enabled method for optimizing fund allocation to investments and liabilities. With this method, at least one asset is provided, wherein each asset has a value and a projected return rate, and wherein the projected return rate represents a rate at which the value is expected to appreciate over a period. At least one liability is also provided, wherein each liability has a liability amount and an interest rate, and wherein the interest rate represents a rate at which the liability amount is expected to depreciate over said period. The method includes optimizing fund allocation to the at least one asset and the at least one liability based on the expected appreciation of the at least one asset account and the expected depreciation of the at least one liability account.

A second embodiment of the invention provides a system for optimizing fund allocation to investments and liabilities. With this system, fund allocation to at least one asset and at least one liability is optimized, wherein each asset has a value and a projected return rate which is a rate at which the value is expected to appreciate over a period, and each liability has an liability amount and an interest rate which is a rate at which the account value is expected to depreciate over said period. The system comprises a user interface that receives an input from a user defining the at least one asset account and the at least one liability account, a processing engine that produces an output defining a fund allocation to the at least one asset and the at least one liability based on the expected appreciation of the at least one asset and the expected depreciation of the at least one liability, and an electronic file storage to store said input and said output.

A third embodiment of the invention provides a computer-readable medium with instructions recorded thereon, which instructions, when executed, cause at least one processor in a computer system to perform a method of optimizing fund allocation across financial accounts. The method comprises an act of providing a user interface which receives input from a user defining at least one asset and at least one liability, wherein each asset has a value and a projected return rate which is a rate at which the value is expected to appreciate during a period, and wherein each liability has a liability amount and an interest rate which is a rate at which the liability amount is expected to depreciate during said period. The method also comprises processing said input to produce an output defining a fund allocation to the at least one asset and the at least one liability based on the expected appreciation of the at least one asset and the expected depreciation of the at least one liability during said period. The method further comprises displaying said output, on said user interface, to said user.

A fourth embodiment of the invention provides a computer-readable medium with instructions recorded thereon, which instructions, when executed, cause at least one processor in a computer system to perform a method of optimizing fund allocation across financial accounts. The method comprises receiving input, provided by a user via a user interface, defining at least one asset and at least one liability, wherein each asset has a value and a projected return rate which is a rate at which the value is expected to appreciate during a period, and wherein each liability has a liability amount and an interest rate which is a rate at which the liability amount is expected to depreciate during said period. The method also comprises processing said input to produce an output defining a fund allocation to the at least one asset and the at least one liability, based on the expected appreciation of the at least one asset and the expected depreciation of the at least one liability during the period. The method further comprises transmitting said output to said user via said user interface.

A fifth embodiment of the invention provides a method for developing a financial plan for a client using a computer system. The method comprises receiving an input from the client, wherein the input is provided via a user interface presented by the computer system. The input defines at least one asset and at least one liability, each asset having a value and a projected return rate which is a rate at which the value is expected to appreciate over a period, and each liability having a liability amount and an interest rate which is a rate at which the liability amount is expected to depreciate over said period. The method also comprises analyzing said input to produce a fund allocation to the at least one asset and the at least one liability based on the expected appreciation of the at least one asset and the expected depreciation of the at least one liability. The method further comprises providing said fund allocation to said client via said user interface.

DESCRIPTION OF THE DRAWINGS

In the drawings, in which like reference designations indicate like elements:

FIG. 5 depicts an exemplary graphical interface to facilitate a user's interaction liability accounts;

FIG. 8 depicts an exemplary interface to facilitate a user's interaction with income tax data in one system embodiment;

FIG. 14 depicts an exemplary interface to facilitate a user's input of budget information;

FIG. 15 is a tabular representation of data representing cash flow by account category, according to an embodiment of the invention; and FIG. 16 is a tabular representation of data used to collect advisor fees based on cash flow, according to an embodiment of the invention.

DETAILED DESCRIPTION

According to various aspects of the present invention, a system and method are provided to allow a user to more effectively formulate a plan to reduce debt and manage investment growth. According to one aspect of the invention, a software application is provided that enables individuals and organizations to apply a realistic set of parameters to liability and asset accounts, such that they will be able to identify the actions necessary in order to produce sustained financial growth, and the achievement of financial goals. According to one aspect of the invention, the software application enables a user to reevaluate the purpose of each liability account, so that only the highest-performing debt remains in the user's portfolio. Another aspect of the invention also allows a user to more fully utilize leveraged assets to maximize financial growth over time.

According to one aspect of the invention, assets and liabilities are treated as mirrored concepts. They exert similar, but opposite, tensions on net worth, so the reduction of a liability necessarily enables a user to increase the value of an asset (and vice versa). While some debt is typically necessary, eliminating low-performing debt and seeking high-performing investments leads to higher net worth over time. According to one aspect of the invention, the software application visually illustrates to a user the effects of cash flow, interest and time on the user's financial goals. One embodiment of the invention provides a facility for refinancing certain debts to reduce a user's tax liability and/or provide interest cost savings, and allows a user to use those savings to fund investments or further reduce liabilities.

With one embodiment of the invention, the software application includes an optimization function which produces recommendations on using funds to repay liabilities or fund investments. According to one aspect of the invention, the optimizer function allows a user to gain financial security by eliminating low-performing liabilities and by maximizing the return on investments. In one embodiment the optimization function takes into account interest rates charged to those liabilities, return rates earned by those investments, and other criteria established by the user. The optimizer function may also recommend when to stop funding certain accounts or instruments. For instance, it may recommend that the user stop funding an insurance instrument because investments have appreciated to a point where insurance is no longer necessary, or may recommend that an underperforming investment not be further funded.

Figure 1:
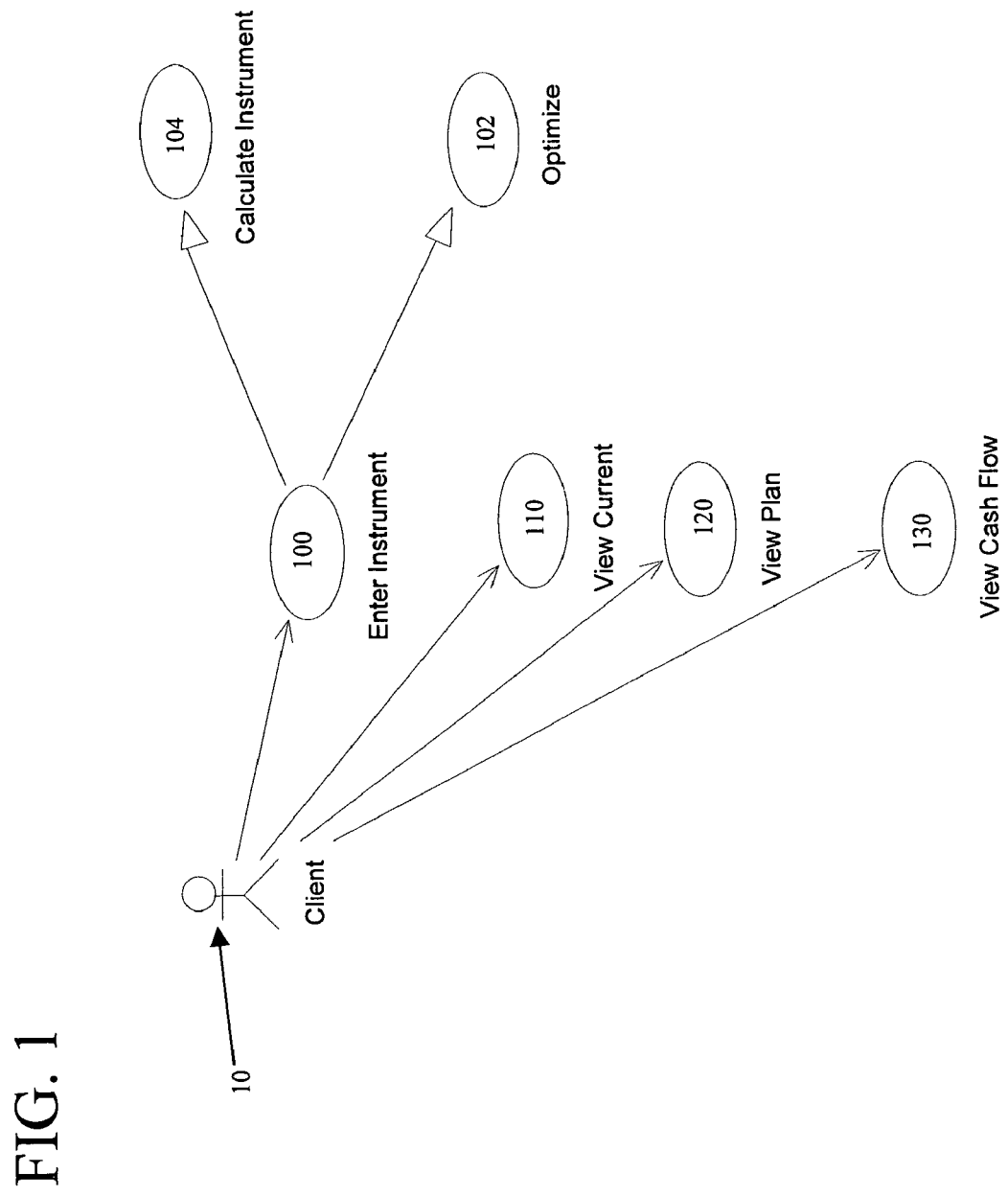
FIG. 1 is a functional block diagram depicting the relationship between certain system functions in one system embodiment.

FIG. 1, which is a use case diagram of an exemplary system embodiment, depicts a mode of use whereby a user (as Client 10) employs the system to manage financial accounts. Although an exemplary user may be an individual performing personal financial planning, it should be appreciated that corporations and other entities may benefit by various aspects of the invention, and the invention is not limited to any particular type of user. The embodiment depicted presents client 10 with four primary functional options, each of which may be presented to a user in a graphical user interface (GUI) such as the one shown in FIG. 5. These functions may be, for example, be implemented by programming a general purpose computer (discussed below) to perform these functions using a high-level programming language.

Enter Instrument 100 is a function which allows a user to provide input data on one or more asset and liability accounts for processing by the application. For example, a user may provide data on asset accounts like real estate holdings, mutual funds, stocks, bonds, IRAs, and/or other asset or investment accounts. A user may also provide data on liability accounts like mortgages, credit cards, loans and/or other liability accounts.

Optimize 102 is a function that performs calculations on input data to produce recommendations for allocating funds to financial accounts. For example, optimize function 102 may calculate rates of return for investment and debt accounts and evaluate the performances of these accounts over time. Processing performed as part of optimize function 102 is discussed in further detail below.

Calculate instrument 104 is a function which performs additional calculations on input data to facilitate further analysis. In one embodiment, when a user provides input data on a credit card account in the form of a balance and an interest rate, calculate instrument 104 calculates a total interest cost over a defined period. Other embodiments may provide for additional or alternative calculations.

View current 110 allows a client 10 to view data on financial accounts (debt and investment accounts) entered into the system within a single graphical interface, so that the resulting financial situation can be viewed "at a glance". View plan 120 allows a user to view a financial plan produced, for example, by optimize function 102. view cash flow 130 allows a user to see savings generated by adopting a plan produced by optimize function 102, as compared to the user's existing approach to allocating funds to investment and debt accounts.

It should be appreciated that although the above-described embodiment is directed to managing the allocation of funds to specific accounts, the invention is not limited in this regard, as funds may also, or alternatively, be allocated to specific financial instruments. For an example, rather than being allocated to an equity account, funds may be allocated to an individual stock.

Figure 2:
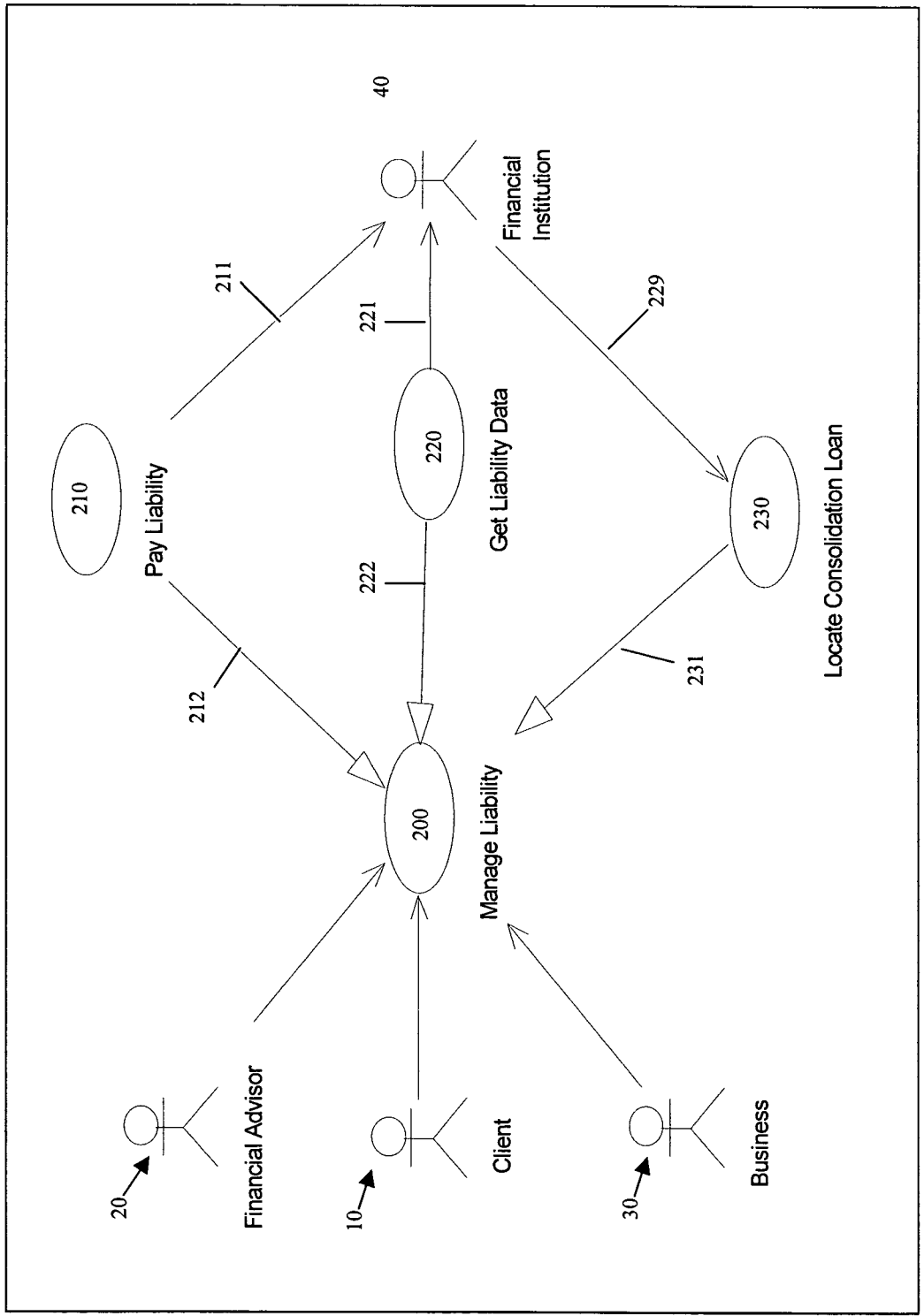
FIG. 2 is a functional block diagram depicting the relationship between other system functions in one system embodiment.

FIG. 2 depicts an alternative system for performing financial planning, designed to support collaborative financial planning and/or electronic data exchange with external entities. Manage liability 200 enables data input from one or more users (client 10, financial advisor 20, and/or business 30). Typically, client 10 and/or business 30 receive fund allocation advice from financial advisor 20, and this advice may be based on data previously provided by client 10 and/or business 30. Advice may be provided to client 10 and/or business 30 synchronously (i.e., financial advisor 20 provides input while client 10 and/or business 30 are also accessing the application) or asynchronously (i.e., input is provided while client 10 and/or business 30 are not accessing the application).

Providing for synchronous and asynchronous data input enables collaboration on financial plans, including detailed fund allocation to financial accounts, without subjecting users to time constraints. According to one aspect of the invention, a method for providing a financial service is performed by a financial advisor to a user using a collaborative system that relates debt to investment.

In one embodiment of the invention, manage liability 200 comprises the enter instrument 100, optimize 102, calculate instrument 104, view current 110, view plan 120, and/or view cash Flow 130 functions described with reference to FIG. 1.

Data provided during use of enter instrument 100 (FIG. 1) may be supplemented with data during execution of get liability 220 (FIG. 2). Get liability 220 allows a user to contact financial institution 40 electronically to retrieve information on one or more financial (typically liability) accounts held by that financial institution. Get liability may be implemented, for example, by a computer program designed to extract account information from one or more sources as is known in the art. Account information may be obtained, for example, by accessing a web site, downloading account information from a web site or other repository, or other conventional methods, as is well-known in the art. Electronic communication may be facilitated, for example, via conventional tools such as access to the Internet, dial-up connection, or other conventional access methods. Pay liability 210 and locate consolidation loan 230 allow users 10, 20 and/or 30 to perform direct actions on liability accounts. For example, Pay liability 210 may allow a user to make an electronic payment, using tools and techniques well-understood in the art, to financial institution 40 for one or more accounts. Locate consolidation loan 230 allows a user to query financial institution 40 for financial instruments (e.g. available loans such as, for example, tax-deductible or consolidation loans), which can be used to refinance any or all liability accounts held by users 10, 20, and/or 30.

Figure 3:
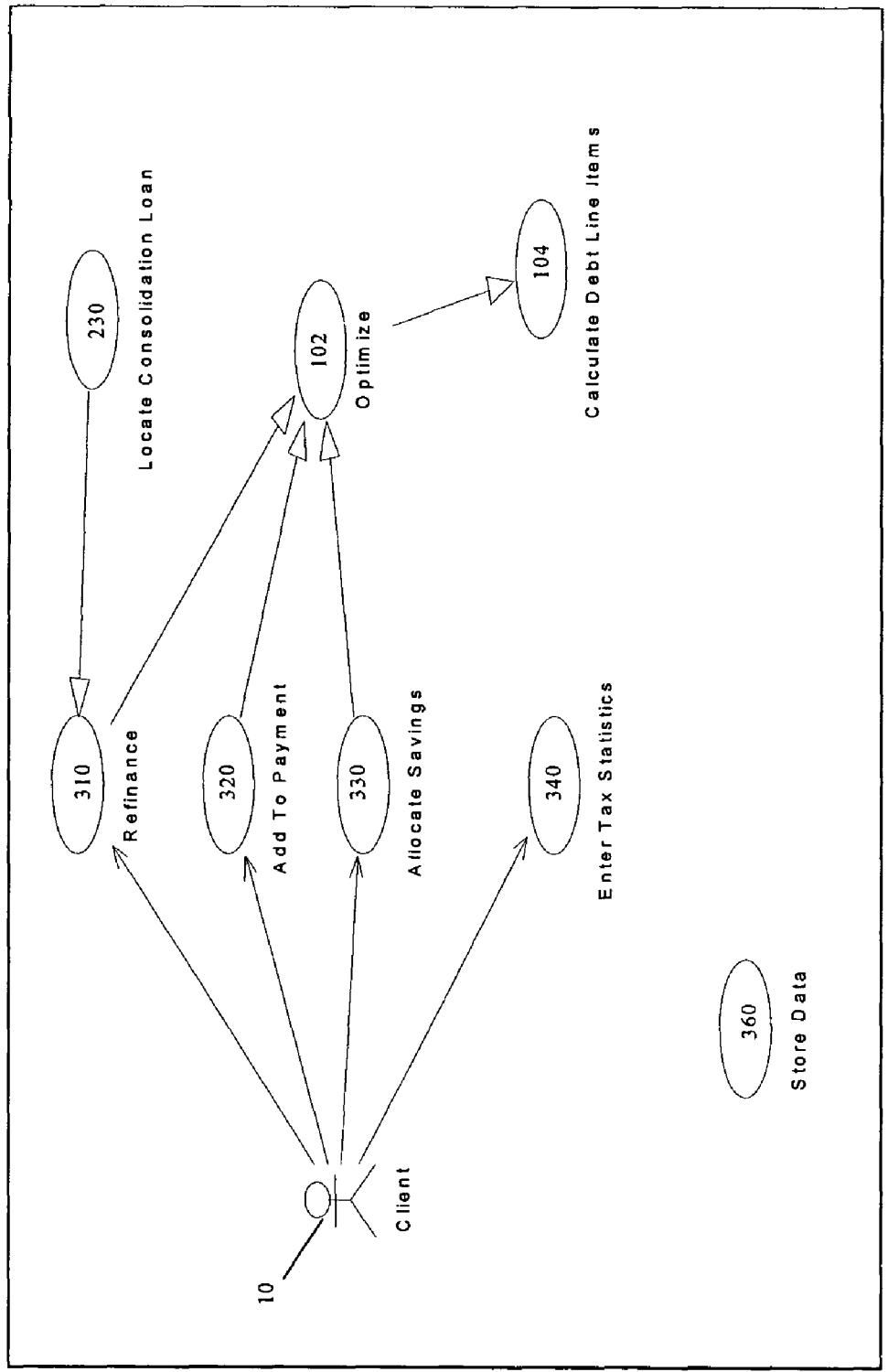
FIG. 3 is a functional block diagram depicting the relationship between yet other system functions in one system embodiment.

FIG. 3 depicts additional actions a user may take using manage liability 200. In the embodiment depicted in FIG. 3, four functional options are available to Client 10: refinance 310, add to payment 320, allocate savings 330, and enter tax statistics 340. Although client 10 is the only user depicted in FIG. 3, in various embodiments of the invention, these functional options may be employed by client 10, financial advisor 20, business 30, and/or other entity, as is depicted in FIG. 2.

In FIG. 3, refinance 310 allows a user to refinance any or all liability accounts using a function such as, for example, locate consolidation loan 230. Add to payment 320 function allows a user to specify that a supplemental payment (i.e., in excess of an intended amount) be made to one or more accounts. Allocate savings 330 allows a user to direct funds made available by adopting recommendations issued by optimize 102 to one or more accounts.

According to the embodiment depicted in FIG. 3, refinance 310, add to payment 320 and allocate savings 330 use Optimize 102, meaning that a user's data entry within functions 310, 320, 330 cause optimize 102 to recalculate an optimal allocation of funds across accounts. Further, optimize 102 uses calculate debt line items 104, so that as a new fund allocation plan is calculated, calculations on the detailed data defining the accounts are re-executed as well.

Enter tax statistics 340 allows a user to provide data from one or more state and/or federal tax returns, in order to view tax savings realized by refinancing one or more liability accounts as recommended by optimize 102. Store data 360 initiates storage of data produced by refinance 310, add to payment 320, allocate savings 330, and/or enter tax statistics 340 on a computer-readable medium such as a personal computer's hard drive, CD-ROM, storage located on a server, flash memory, or any other type of storage medium. Information may be stored for a client's use, or optionally by other entities such as a business 30 or a financial advisor 20 as discussed above. Data may be processed or stored in any format, on any medium, by any controller, processor, or computer, and the invention is not limited to any particular implementation.

Figure 4:
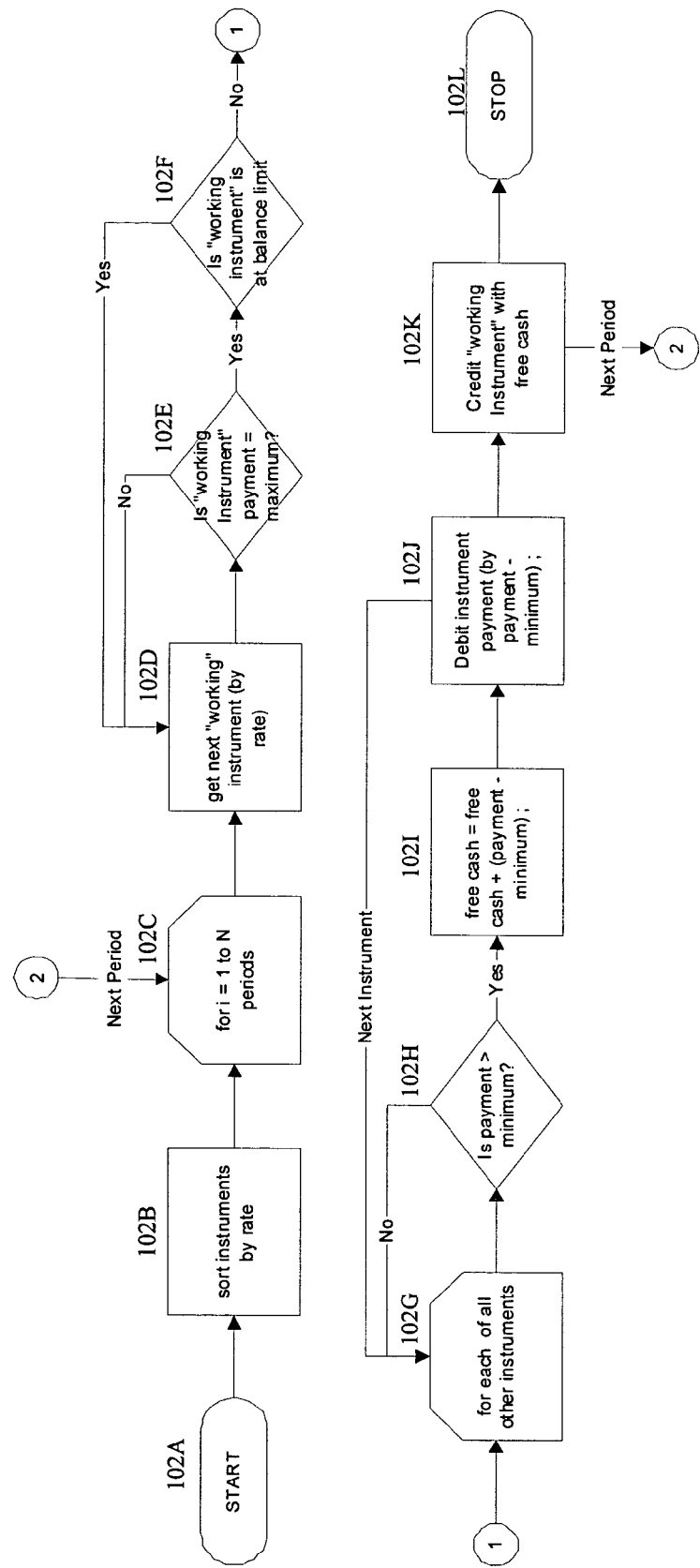
FIG. 4 is a flowchart depicting the steps defining one embodiment of the optimization function.

Processing steps comprising one embodiment of Optimize 102 are depicted in FIG. 4. In one embodiment of an optimize 102 function, these steps commence (with step 102A) each time a user provides or updates data used by the application. In step 102B, financial accounts are sorted by expected return rate or interest rate so that accounts are selected for processing in descending rate order. In step 102C, a loop initiates to repeat a group of steps (described below) for each period. In step 102D, an instrument is chosen for processing, and in step 102E, the process determines whether the payment currently made to the considered instrument is the highest payment made to any instrument. If not, the instrument with the highest rate and payment is selected for processing.

In step 102F the process determines whether the instrument has reached a balance limit (i.e., if the instrument is a liability account, whether the obligation has been repaid, and if the instrument is an investment account, whether the balance has not reached a user-defined amount), and if it has, the next instrument is selected for processing.

Once the system has selected the instrument with the highest rate, highest payment, and which is not at the balance limit, in step 102H it determines whether the payment currently allocated to that instrument exceeds the minimum. If so, in step 102I the application calculates "free cash", defined as the difference between the current payment and the minimum payment, plus any other funds available to the user.

In steps 102J and 102K, the planned payment for the selected instrument is debited by free cash. This process is then repeated for each instrument in the list for the current period, then for all subsequent periods, until in step 102L the process completes. The system then produces a plan for each period whereby funds are directed toward the account(s) with the highest interest and/or return rate, so that the user may either minimize interest accrued on liability accounts, and/or maximize the return from investment accounts. According to one embodiment of the invention, the system allows a user to specify exactly how the function plans an allocation of funds to accounts. In one example, the function plans a direction of funds only to liability accounts until all debt has been repaid, so that a user eliminates debt as quickly as possible. In another example, the function plans a direction of funds to instruments with the highest rate (i.e., interest rate or return rate), so that net worth is maximized over time.

It should be appreciated that optimize 102 function may include a different number of steps, may perform steps in a different order, and/or may include other steps which supplement or take the place of those described herein.

FIG. 5 depicts an exemplary GUI interface 500, which allows a user to more effectively manage liability accounts by viewing current and planned fund allocation plans within the same interface. Although it is shown by way of example that GUI 500 may be implemented in the Microsoft Windows operating system, it should be appreciated that the invention is not limited to any particular platform, computer system, or operating system. For example, embodiments may execute on other operating systems such as, but not limited to, Apple OS, Sun Solaris, Linux, Unix, and Palm OS executing on a variety of hardware, such as a general purpose computer (e.g. personal computer, server, workstation, mainframe, or the like). Further, embodiments of the invention may execute on devices other than a personal computer, such as, but not limited to, an Internet appliance, a personal digital assistant (PDA), and a cellular telephone.

The embodiment depicted of GUI interface 500 typically is created by executing a computer program written in a high-level computer programming language. For example, various aspects of the invention may be programmed in one or more computer programming languages including, but not limited to, C++, Java, C# (C Sharp), Visual Basic (available from the Microsoft Corporation), or any other computer programming language or combination of programming languages.

Depending on the embodiment, GUI interface 500 may interface with additional computer programs written in C++, Java, or any other programming language, that define logical operations, or "business logic" performed by the system. Data defining liability accounts is shown in current liabilities 515. System-calculated summary data, including totals and/or averages based on user-provided data elements, are depicted in items 520, 525, 530, 535, and 540. As shown, these and other items may be implemented as display and/or entry boxes, checkboxes or other element type in interface 500. Item 545 shows a summary plan for fund allocation as issued by optimization function 102. In Item 545, liabilities are shown as in item 515, along with system-calculated summary data in Items 550, 555, 560, 565, and 570. As can be seen by comparing total interest expense for current and planned fund allocation strategies shown in items 535 and 565 respectively, and debt-free dates shown in items 540 and 570 respectively, optimize 102 issues a fund allocation plan which allows a user to save $4,000 and be debt free five months earlier than anticipated. By selecting item 575, a user may view further detail (e.g., as discussed further below) defining the total interest expense difference of $4,000. Buttons 320, 310, 340, 330 and 350, shown at the bottom of the interface, when selected, perform functions with like designations such as those described with reference to FIG. 3, and such as those discussed in further detail below.

In one embodiment, a user may employ a budget function to determine the funds which may be applied to assets and liabilities according to the optimization function. An to example of an interface which allows a user to enter budget information is depicted in FIG. 14. Interface 1400 comprises data entry boxes allowing a user to provide information on various income and expense categories for a given period. For example, earned income box 1405 allows a user to enter information on income such as wages, investment income box 1410 allows entry of information such as interest earned, retirement income box 1415 allows entry of information such as social security benefits earned, and other income box 1420 allows entry of information such as unanticipated earnings. Similar data entry facilities are provided for expenses, including taxes box 1430, retirement contributions box 1435, other savings box 1440, committed expenses box 1445 and discretionary expenses box 1450.

In one embodiment, the budget period may be any desired time interval, such as a year, month, week, or any other desired period.

In one embodiment, rather than entering summary amounts in the boxes provided on interface 1400, a user may place the cursor in any of the boxes shown, then click enter details box 1480. Upon doing so, the user is taken to another interface (not shown) which allows entry at a more detailed level. For instance, rather than entering a summary of all retirement contributions for the period in box 1435, a user may enter detail on individual retirement contributions by placing the cursor in box 1435 and clicking box 1480. After detailed data entry using the other interface is complete, the user is returned to interface 1400, where a total of the detailed amounts is depicted in box 1435.

The "already applied" boxes on interface 1400 are supplied to allow the user to indicate that certain information has already been entered into the system (for example, by using the add to payment 320 function), so that amounts are not double-counted. For example, already applied investment income box 1411 allows the user to indicate that income earned from investments has already been accounted for in the system (i.e., that the amount entered in investment income box 1410 has been entered or otherwise considered in other accounts previously entered into the system). Similar boxes allow the user to indicate that retirement income (1416), retirement contributions (1436), and other savings (1441) have already been considered. Preventing income or expense information from being double-counted allows optimization function 102 to function most effectively.

Upon the user's entry of income and expense information, totals for each are displayed in gross income box 1425 and gross expenses box 1455, respectively. In one embodiment, these totals are displayed as soon as the user enters any income or expense information, regardless of whether the user has finished entering this data. Gross income and gross expenses drive the calculation of the amount shown in gross margin box 1460, labeled "income-expenses." This is the total amount which, according to the user's budget, may be allocated to investment or liability accounts in the period. In one embodiment, if the amount displayed is greater than zero, the user may indicate a percentage of the gross margin to be optimized in allocation percentage box 1465. Using this facility, the user may allow the entire gross margin for the period to be allocated to investment and/or liability accounts according to optimizer function 102, or only a portion thereof. A user may wish to allocate only a portion of the gross margin to investments and/or liabilities to manually direct the remainder to a particular account, or group of accounts. The amount actually applied to the optimizer function is displayed in amount applied box 1470.

Once the user is satisfied with the amount shown in box 1470 to be applied to the optimizer function, enter box 1475 allows the user to apply the amount. When enter box 1475 is clicked, the optimizer function recalculates the user's financial plan, as shown in FIG. 5, based on the amounts entered on interface 1400. The user may exit interface 1400 by clicking the close button 1485.

Figure 6:
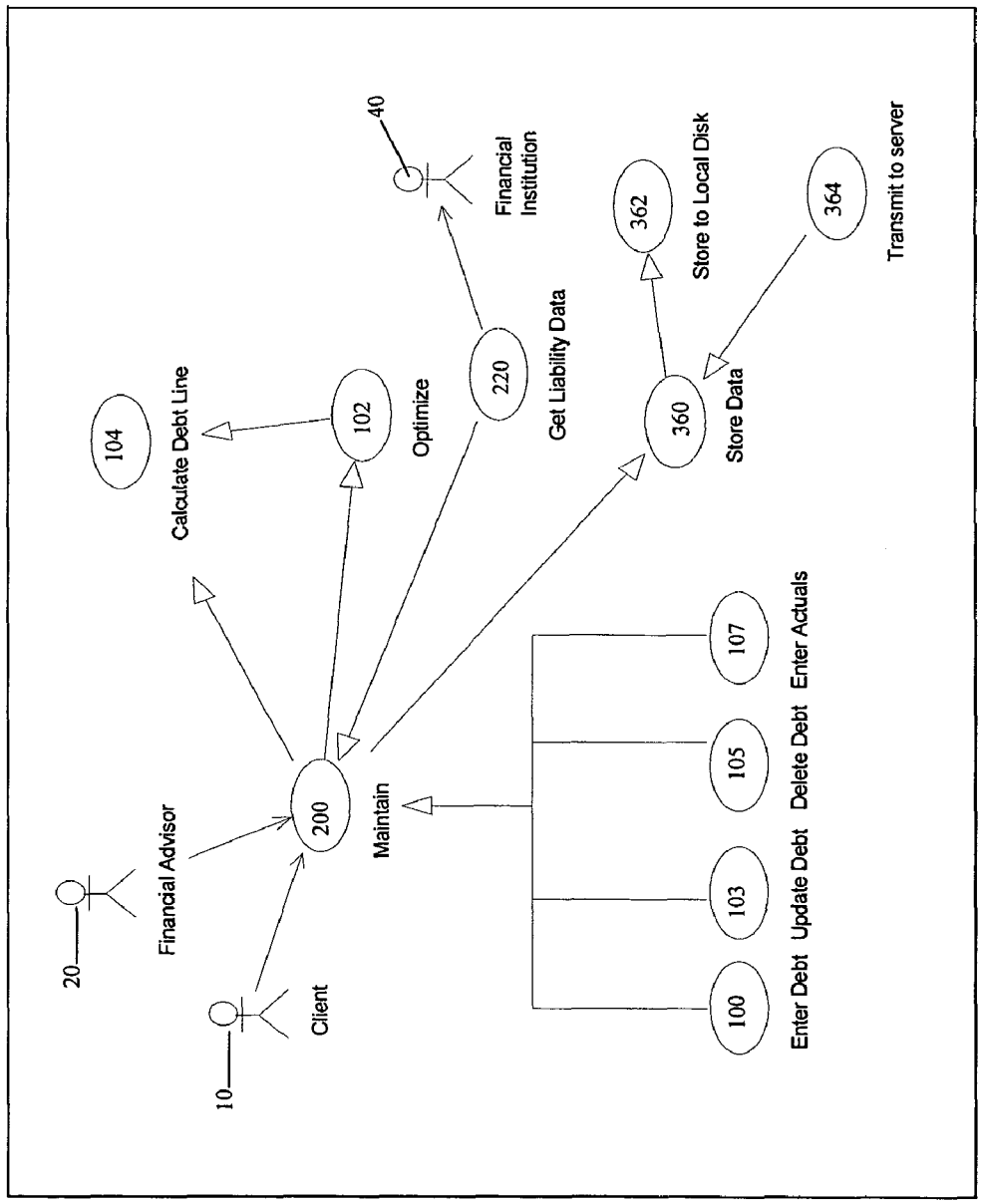
FIG. 6 is a functional block diagram depicting the relationship between yet other system functions in one system embodiment.

FIG. 6 shows one embodiment of a mode of use wherein a client 10 and a financial advisor 20 collaboratively produce a financial plan using maintain debt 200. Functions enter debt 100, update debt 103, delete debt 105, and enter actuals 107, which may be employed by client 10, financial advisor 20, both, or other entities, allow users to update one or more financial accounts. Maintain debt 200 uses optimize 102 function to produce new recommendations based on updated information. Optimize 102 uses calculate debt line item 104 to perform additional calculations on data defining one or more liability accounts. Get liability data 220 may be used by users 10 and/or 20 to submit an electronic query to financial institution 40 for data defining one or more financial accounts. Based on this and other data, maintain debt 200 may invoke optimize 102 and, therefore calculate debt line items functions 104. Maintain debt 200 may also invoke store data 360 which may include storing financial information to local disk 362 (to store information on a user's local storage device) and/or transmit to server 364 (to store information on a remote storage device), for example.

Figure 7:
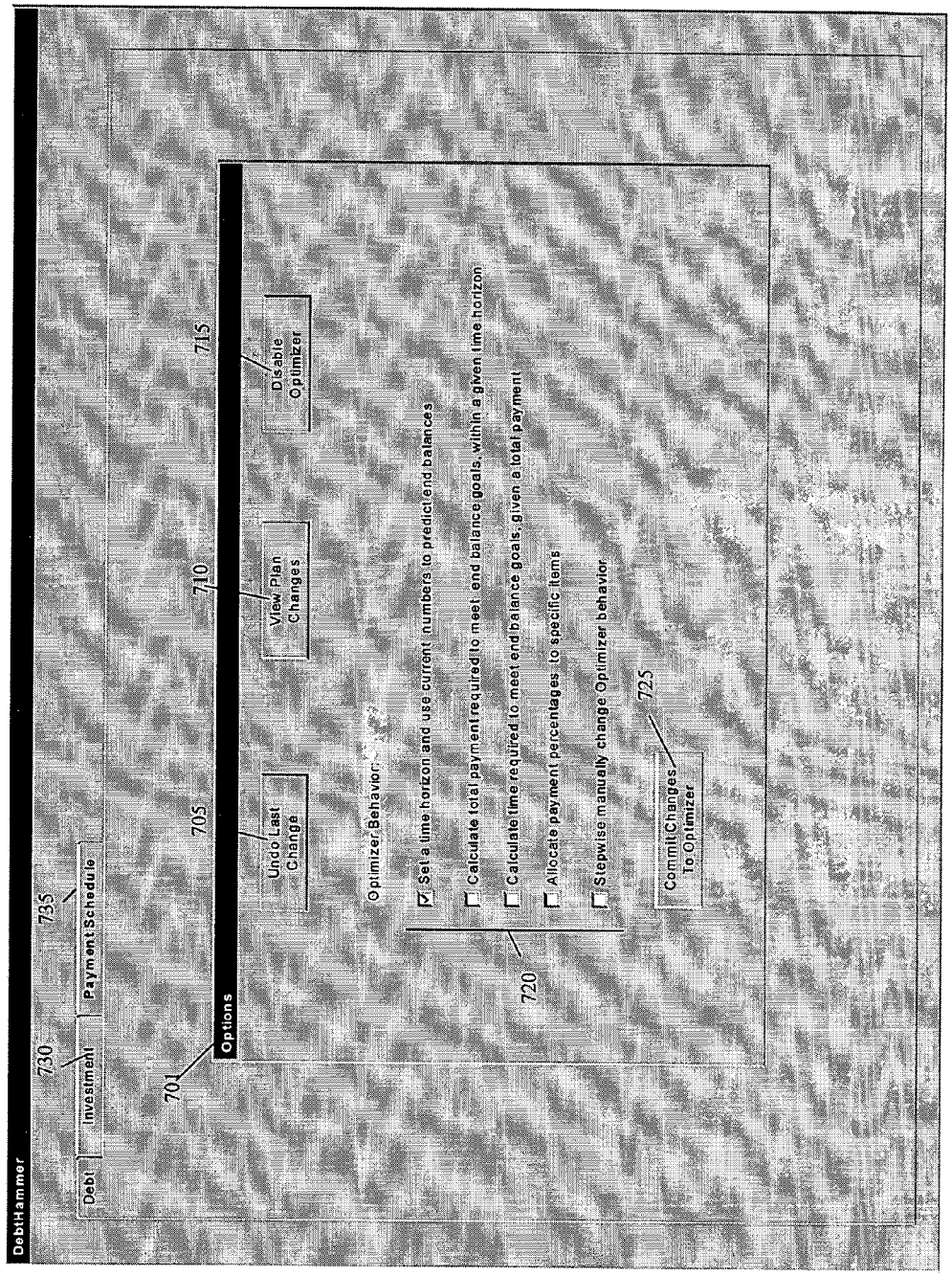
FIG. 7 depicts an exemplary interface to facilitate a user's configuration of the optimization function in one system embodiment.

FIG. 7 depicts an exemplary interface 700, which enables a user of one embodiment to configure an optimizer function (e.g. Optimizer 102), and which a user enters by invoking function 350 shown on FIGS. 3 and 5. Within Dialog Box 701, a user is presented a series of check boxes 720 which enable user configuration. A user will select one of the options in check boxes 720 by selecting (i.e., by employing a mouse or similar input device) a box corresponding to a desired setting. While the embodiment depicted allows a user to click only one box, other embodiments may allow multiple settings to be selected.

In one embodiment of the invention, items 705, 710, and 715 are provided which are selectable controls (e.g. buttons) that allow a user to perform additional configuration of the optimizer function. In particular, item 705 allows a user to revert to a previous setting, item 710 allows a user to view the impact on a financial plan of a change to the configuration, and item 715 allows a user to disable the optimizing function and enable a manual allocation of funds to the different financial accounts. Typically, items 705, 710, and/or 715 are employed so that once a selection is made in check boxes 720, item 710 allows a user to see how the changes have affected the financial plan, item 705 allows him/her to undo the change if desired, and item 725 allows him/her to "commit" changes if he/she is satisfied with the change(s). Selecting item 725 (e.g. by clicking a mouse) and committing changes allows a user to specify that subsequent optimization operations will reflect selections made within check boxes 720 until he/she returns to interface 700 and changes the selection. In the embodiment depicted, selecting box 725 returns the user to the main interface 500 depicted in FIG. 5.

Figure 8:
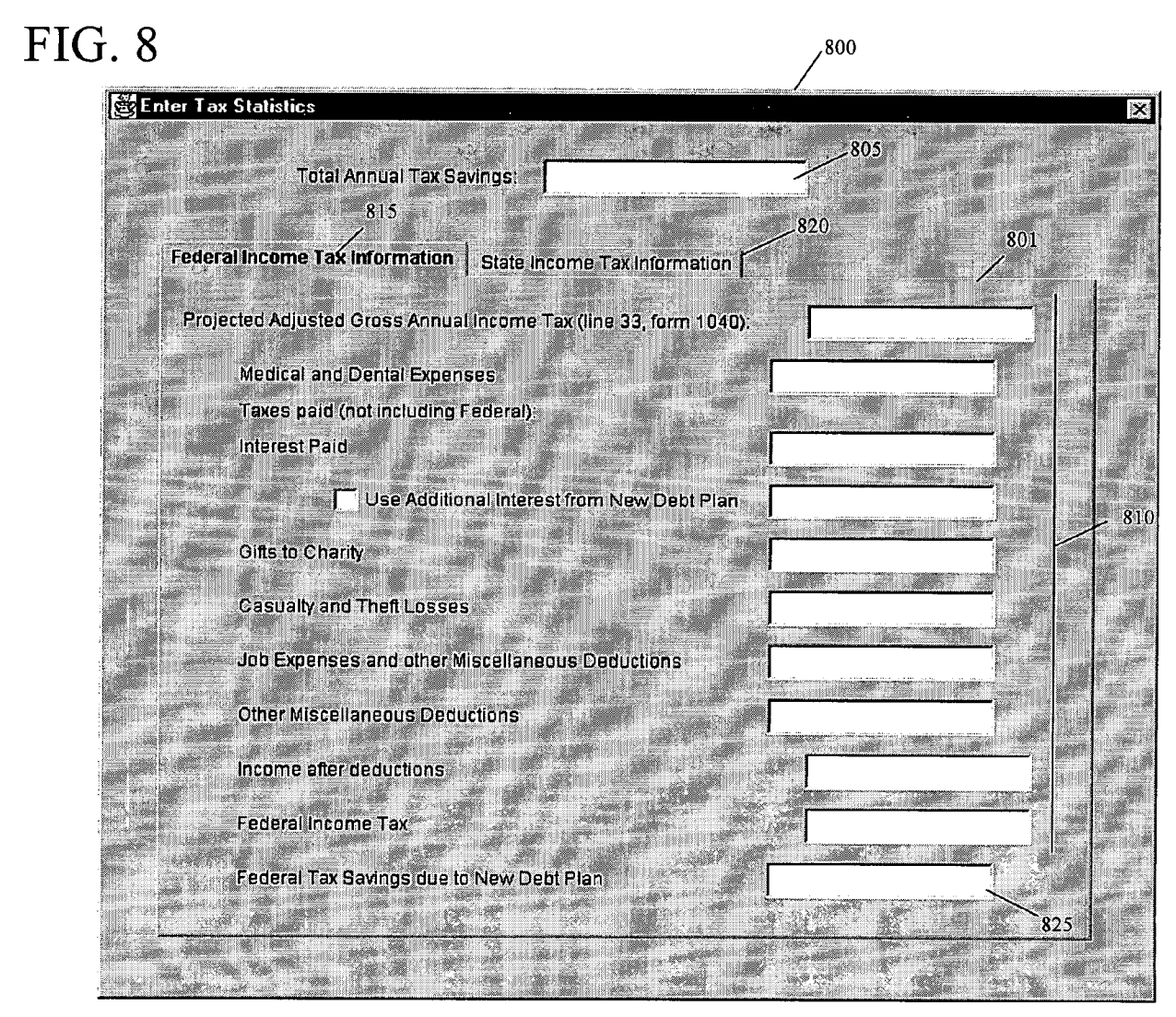

FIG. 8 depicts exemplary interface 800, which allows a user to provide detail on and view tax savings achieved by modifying financial plans, and which a user enters by invoking enter tax statistics 340, shown on FIGS. 3 and 5. Item 805 displays a summary of total tax savings realized on a user's financial plan, which is a sum of federal and state income tax savings. Federal and state income tax detail is provided by selecting tabs 815 and 820, respectively. In this embodiment, since tab 815 has been selected, items 810 allow a user to provide data from a federal income tax return to view federal income tax savings in item 825. By selecting tab 820, a user is provided an interface with a separate set of items (not shown) which allows him/her to provide similar data from a state income tax return, and view resulting state income tax savings. Once data is provided in items 810, federal income tax savings are displayed in Item 825.

Figure 9:
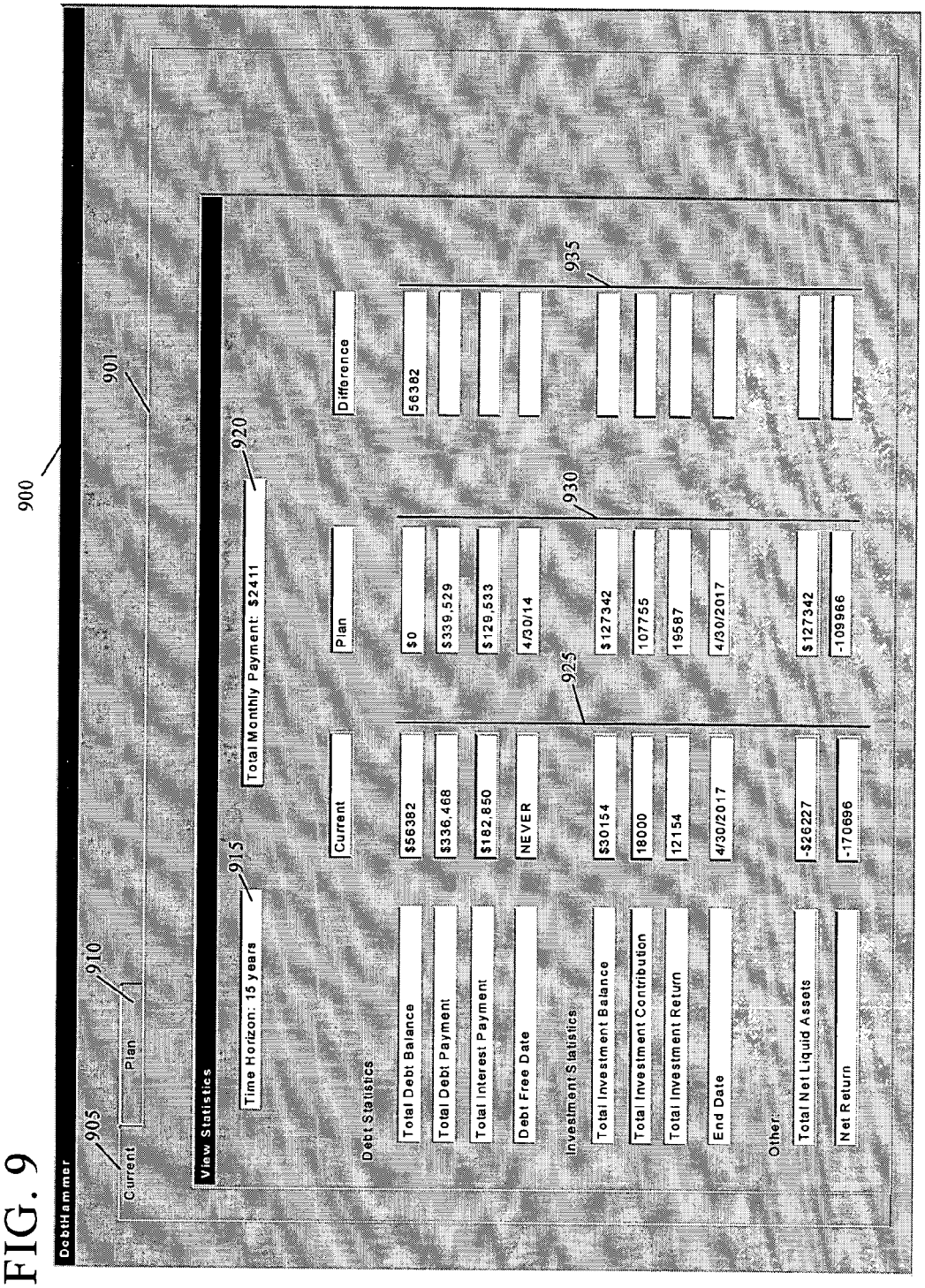
FIG. 9 depicts an exemplary interface to facilitate a user's interaction with fund allocation specifics in one system embodiment.

FIG. 9 depicts exemplary interface 900, which allows a user to view the difference between a current (i.e., before employing the application) financial plan and a system-generated plan, and which corresponds to functions 110 and 120 depicted in FIG. 1. Within item 901 the user is able to view the specifics of both a current and planned financial strategy. Items 925 display for the user various details of their current financial plan, such as a total debt balance, total debt payment, total interest payment, and date at which the user becomes debt-free. These same details for a strategy recommended by the system are shown in items 930, and the difference (i.e., the planned amount subtracted from the current amount) is shown in items 935. Item 915 shows a user-defined time horizon, and item 920 shows a total monthly payment.

Figure 10:
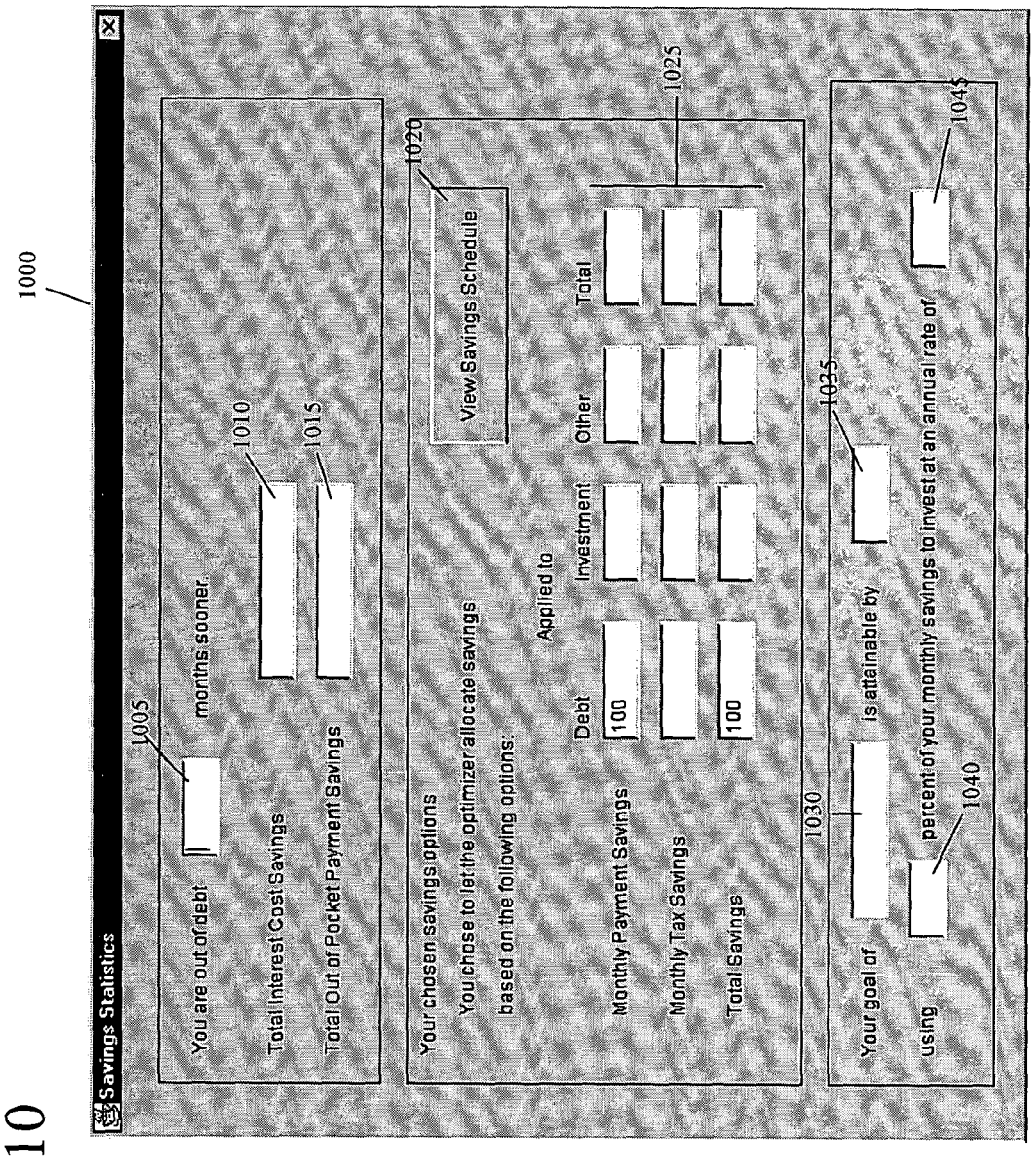
FIG. 10 depicts an exemplary interface to facilitate a user's interaction fund allocation results in one system embodiment.

FIG. 10 depicts exemplary interface 1000, which provides further detail, and enables further action, on savings a user enjoys by adopting a system-generated plan. A user enters interface 1000 by invoking view savings 575, depicted in FIG. 5. Item 1005 displays a number of months sooner by which a user's debt will be repaid by adopting the system-generated plan rather than proceeding with the current plan. Similarly, item 1010 displays interest savings realized, and item 1015 displays cash, or "out of pocket", savings. By selecting item 1020 the user is switched to a different interface (e.g. such as the interface depicted in FIG. 11) which allows him/her to allocate any or all of these savings to one or more accounts. An example of this interface is described in greater detail below. In addition to using the interface depicted in FIG. 11, a user may optionally use items 1025 to specify an allocation of savings to accounts. Items 1030, 1035, 1040 and 1045 display for the user the result of adopting the system-generated plan. Specifically, item 1030 displays a user's previously specified financial goal, obtainable by a date shown in item 1035 (assuming the user continues to follow recommendations issued by the system), and by allocating a percentage of other savings in item 1040 to investment accounts earning an annual rate of return shown in item 1045.

Figure 11:
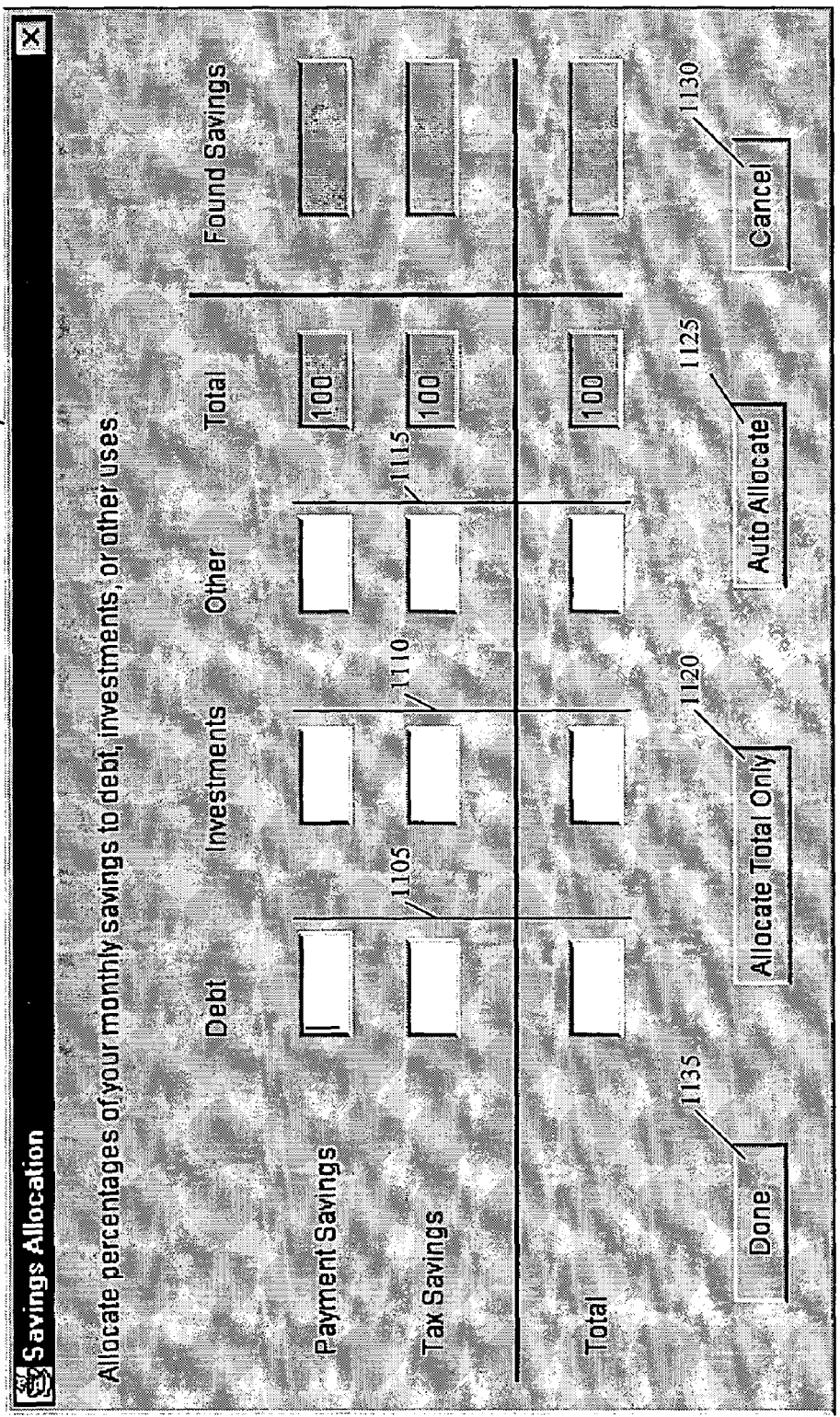
FIG. 11 depicts an exemplary interface to facilitate a user's reallocation of savings in one system embodiment.

FIG. 11 depicts exemplary interface 1100, which allows a user to allocate savings to asset and liability accounts, and which a user enters by invoking allocate savings 330, depicted in FIGS. 3 and 5. As described in the foregoing, according to one embodiment of the invention, a user is switched to interface 1100 after selecting item 1020. Items 1105 allow a user to allocate cash or out-of-pocket payment and tax savings to liability accounts on a monthly basis, while items 1110 allow users to allocate these savings to investment accounts. Item 1115 allows the allocation of payment and tax savings to "other" accounts, which are accounts not categorized as assets or liabilities by the user (one example might be a "rainy day" fund, or an account used to save funds for a specific purchase).

By selecting item 1120, a user may choose to allocate only total savings, i.e., regardless of the individual payment and/or tax savings amounts. Instead of defining the savings allocation manually, by selecting item 1125, a user may opt to have the system define it. In most embodiments, the system will define an allocation based on the interest rates associated with liabilities and return rates associated with investments (i.e., the system will select the account with the highest overall rate for fund allocation). After selecting item 1125, items 1105, 1110, and 1115 will display the amounts the system has determined should be allocated to each type of account, and the user may modify one or more values shown. A user may, by selecting item 1130, cancel any of these specifications and return to interface 1000. By selecting item 1135, a user may finalize these specifications and return to interface 1000 as well.

FIG. 15 depicts a system capability which allows the display of cash flow by account category. The display of cash flow allows a user to see the payments being applied to all accounts in the category, the effect of those payments on the aggregate balance of accounts in the category, and the overall return for accounts in the category. In one embodiment, the assembly of account categories by the user is entirely discretionary. For example, a user may opt to view cash flow for the budget account, aggregate debt accounts and aggregate investment accounts (as shown in FIG. 15), or for each account individually, or for any other discretionary grouping. In the example shown in FIG. 15, the period 1501 defines the time interval for each payment, which is shown in payment columns 1511, 1521 and 1531 for each of the three account categories. The overall balance for each account category as of each payment is shown in balance columns 1512, 1522 and 1532. The aggregate return for each account category as of each payment is shown in return columns 1513, 1523 and 1533.

A user may use this capability to, for instance, view cash flow for groups of investment accounts by categorizing them into taxable and non-taxable account groups. In another example, a user may view liability accounts by categorizing them into tax-deductible and non-tax-deductible account groups. Using this capability of the system, a user may view the aggregate balance and return on any grouping of accounts desired.

FIG. 16 depicts a system capability which allows the calculation of advisor fees based on cash flow (i.e., the total of all payments made to each user account). In one embodiment, a user may select a percentage of the cash flow during a period to determine advisor fees for this period, using any of a number of conventional methods. In FIG. 16, the user has determined that advisor fees will equal 1% of all cash flow for the accounts that the advisor oversees. For each month shown in column 1601, the corresponding cash flow and fees are shown in columns 1602 and 1603, respectively. Total annual cash flow 1604 equals the total cash flow for all clients over all months observed. Similarly, total annual fees 1605 equals the total fees for all clients over all months observed.

Figure 12:
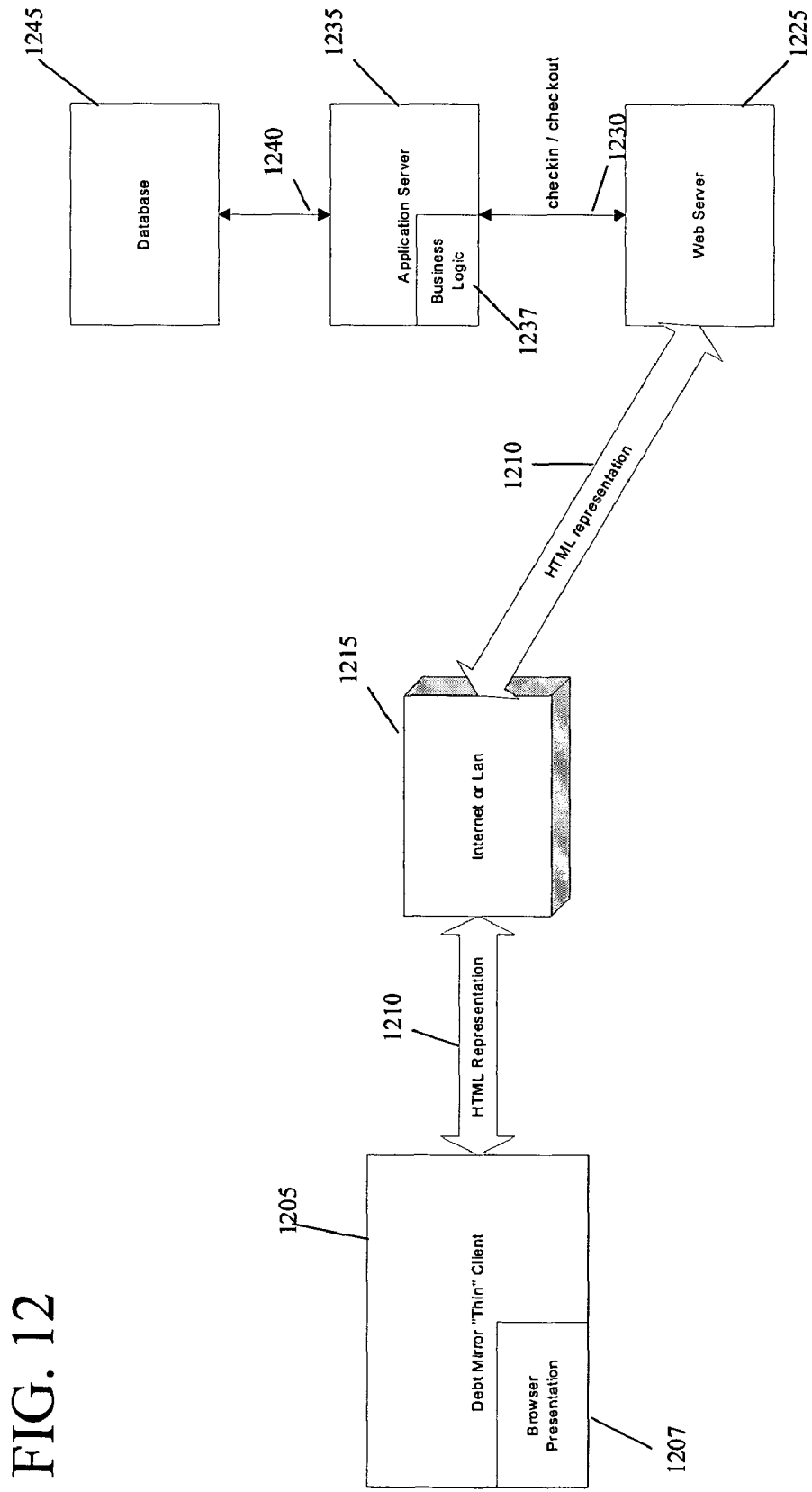
FIG. 12 is a block diagram depicting a system architecture employed by an embodiment of the invention.

FIG. 12 depicts an exemplary systems architecture designed to support one embodiment of the invention. The depicted architecture conforms to a client-server model, and more specifically to a "thin client" version of the model, both of which are well-understood in the art. In the thin client model version, a majority of computer programs which define logical operations to be performed by the system reside on the server, as opposed to residing on one or more clients. In FIG. 12, client 1205, which may be a general-purpose programmable computer, includes browser presentation 1207. In most embodiments, browser presentation 1207 comprises one or more computer programs, such as the Navigator program offered by Netscape or the Internet Explorer program offered by Microsoft, designed to allow a user to access and view data in HTML page format. Other programs may comprise browser presentation 1207, and/or other data formats than that shown being transmitted in step 1210, may be employed as well. Data is typically transmitted using conventional communications network 1215, which may include, but is not limited to, the Internet, a local-area network (LAN), a wireless network, or combinations thereof. Using one or more communication protocols, which conventionally include hypertext transport protocol (HTTP) and transmission control protocol/internet protocol (TCP/IP), browser presentation 1207 retrieves data in 1210 from web server 1225.

In the embodiment depicted, web server 1225, application server 1235 and database server 1245 are hardware components which collectively comprise a web site, although in other embodiments, some or all of components 1225, 135 and 1245 may comprise software which may execute on one or more hardware components, and which may not be connected to the Internet. In the embodiment depicted, application server 1235 executes business logic module 1237, which comprises computer programs defining logical operations performed by the system. Also in the embodiment depicted, application server 1235 communicates in 1240 with database server 1245 to retrieve, and return to storage, data used by the system. Typically, data residing on database server 1235 will be stored using a database software application, although it may also, or instead, be stored using other tools and/or techniques, including being stored in a file residing in a file system on either application server 1235 or database server 1245.

A user initiates computer programs comprising the system using client 1205, and more specifically, browser presentation 1207. Commands to initiate processing are sent from browser presentation 1207 and client 1205 to web server 1225 in 1210 via communications network 1215. In the embodiment depicted, web server 1225, upon receipt of these commands, will seek to authenticate client 1205 and the user(s) employing client 1205. Authentication of users is conventionally accomplished via user submission of usernames and/or passwords, although other methods may be employed. Authentication of client 1205 is conventionally accomplished by validating the internet protocol (IP) address from which a request originates, although other methods may be employed for this authentication as well. Once authentication is completed, web server 1225 conveys user-initiated commands to application server 1235, and more specifically to business logic module 1237, in 1230. Business logic module 1237 processes commands using programmed logic stored on application server 1235 and/or data extracted in 1240 from database server 1245. Business logic module 1237, at the completion of command execution, transmits output data to web server 1225 in 1230. Web server 1225 then transmits output to client 1205 and, more specifically, to browser 1207 in 1210.

In some embodiments, multiple users may employ multiple instances of client 1205 (e.g., separate geographically dispersed computers), and/or execute multiple instances of browser presentation 1207, to simultaneously access a single financial plan. For instance, a client 10 and financial advisor 20 may collaborate on decisions regarding a plan by concurrently accessing the plan. In these embodiments, communications 1230 between web server 1225 and application server 1235 may further comprise a check-in/check-out process for the plan. In some embodiments, the check-in/check-out process comprises logic dictating that only one user is allowed to modify data defining the plan, while other users are only allowed to read it. Other embodiments will comprise logic for maintaining multiple plan versions, so that data consistency is maintained even while multiple users modify the plan. Still other embodiments may comprise other programmed logic or alternative measures to ensure the consistency of data defining the financial plan.

Figure 13:
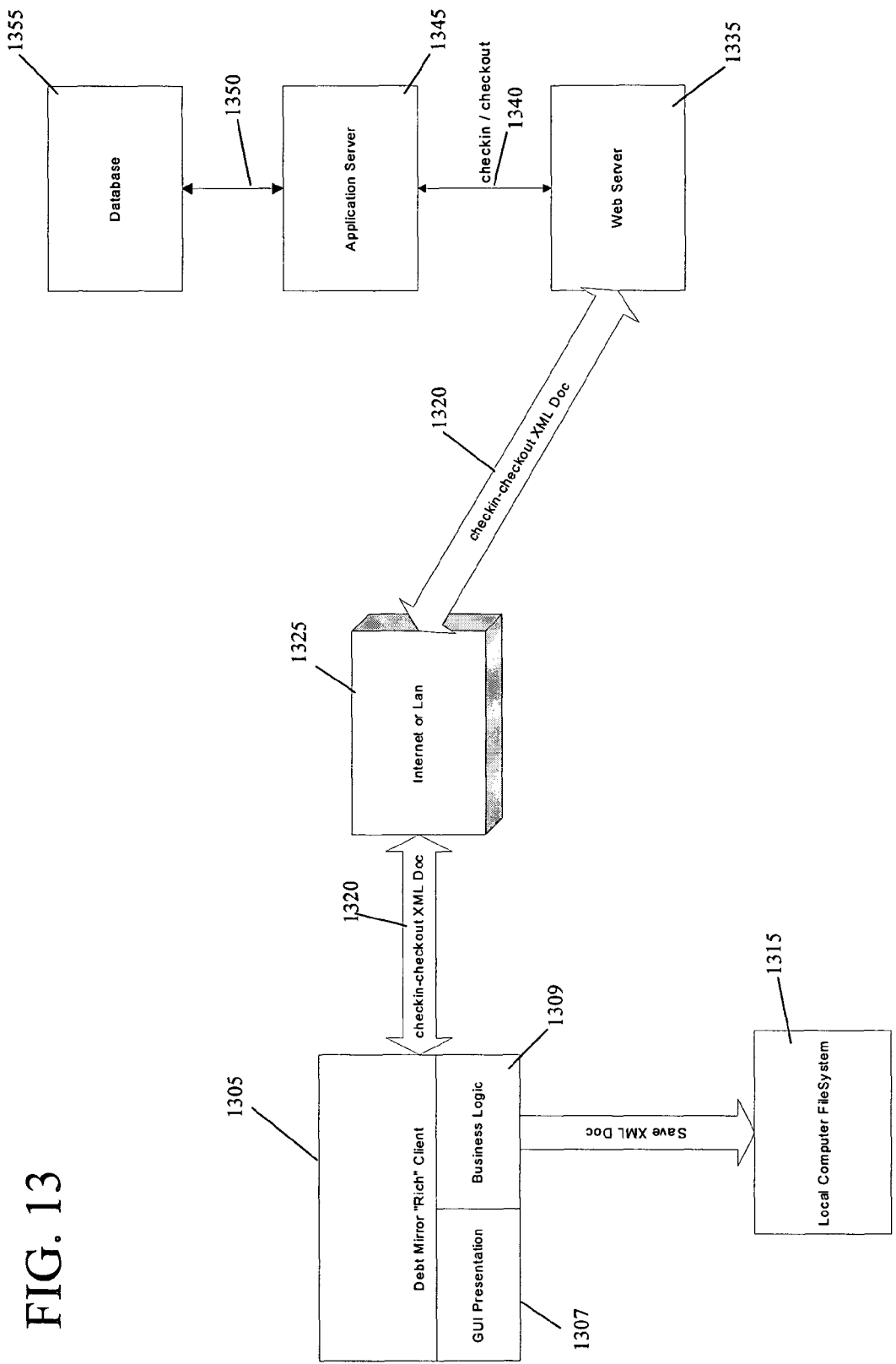
FIG. 13 is a block diagram depicting a system architecture employed by an embodiment of the invention.

FIG. 13 depicts an alternative systems architecture designed to support an embodiment of the invention. The depicted architecture also conforms to the client-server model, but employs a "rich client" version of the model, as is also well-known in the art. In this model version, computer programs defining the logical operations performed by the system reside primarily on the client(s) instead of the server.

In the embodiment depicted in FIG. 13, client 1305 is a general-purpose programmable computer, executing interface presentation 1307 and business logic module 1309. interface presentation 1307 typically comprises computer programs written in Visual C++, Visual Basic, or other computer programming language, defining a graphical interface for the system. Business logic module 1309 typically comprises computer programs written in C++, Java, or other programming language, defining logical operations performed by the system. Business logic module 1309 communicates in 1310 with local computer file system 1315, to transfer data to and from local computer file system 1315. Transferred data will typically take extensible markup language (XML) format, although other formats may be employed.

Transfer of data and commands in 1320 between client 1305 and web server 1335 is typically accomplished using conventional communications network 1325, which may include, but is not limited to, the Internet, a local-area network (LAN), a wireless network, or combinations thereof. Conventionally data transfer is performed with one or more communication protocols, which may include HTTP and TCP/IP. As with the embodiment depicted in FIG. 12, web server 1335, application server 1345 and database server 1355 may collectively comprise a web site although in other embodiments, some or all of components 1325, 1335 and 1345 may comprise software which may execute on one or more hardware components, and which may not be connected to the Internet.

Upon initiating interface presentation 1307, client 1305 also initiates a process of receiving data from database server 1355 (via web server 1335) defining a financial plan as of its last modification. As with the embodiment described with reference to FIG. 12, this process will typically entail authentication of one or more users and/or client 1305. Once authentication is completed and data defining a financial plan is extracted from database server 1345, the data is transmitted from web server 1335 to client 1305, in at least one data format which includes, but is not limited to, XML. Upon receipt, interface presentation 1307 and business logic module 1309 process the data based on programmed commands and input provided by the user.

In the embodiment depicted in FIG. 13, data is transmitted at various intervals in 1310 to local computer file system 1315 for local storage, and to database server 1355 via web server 1335 in 1320 for remote storage. Transmissions in 1310 and 1320 may occur after a user completes all processing of the data, at predefined time intervals, after the execution of a predefined number of commands, at random intervals, or a combination thereof.

As with the embodiment depicted in FIG. 12, multiple users may employ multiple instances of client 1305, and execute multiple instances of interface presentation 1307 and business logic module 1309, to simultaneously access a single financial plan. This access may also comprise a check-in/check-out process as described in the foregoing.

While the invention has been particularly shown and described with reference to specific embodiments, these embodiments are presented by way of example only, and not by way of limitation. It should be understood by those skilled in the art that various changes in form and detail may be made therein without departing from the spirit and scope of the invention, which is defined in the following claims.

What is claimed is:

1. A computer-enabled method for optimizing an allocation of money to a plurality of existing accounts including at least one asset account and at least one liability account, comprising:
   (a) receiving from a user, through an interface of a computer system, at least one of an income entry and an expense entry;
   (b) calculating, by a computer system, free cash flow as a difference between all income entries and all expense entries, relating to the plurality of existing accounts, the free cash flow being expressed in terms of an amount of money;
   (c) receiving an input from a user defining at least one asset account, relating to the plurality of existing accounts, including at least one asset, wherein each asset account has a value and a projected return rate, and wherein the projected return rate represents a rate at which the value is expected to change over a period;
   (d) receiving an input from a user defining at least one liability account, relating to the plurality of existing accounts, including at least one liability, wherein each liability account has a liability amount and an interest rate, and wherein the interest rate represents a rate at which the liability amount is expected to change over the period;
   (e) calculating a net worth as a difference between all asset accounts and all liability accounts;
   (f) calculating, by the computer system, the allocation of a portion of the free cash flow to the at least one asset account and the at least one liability account based on the expected change in the value of each asset account and the expected change in the liability amount of each liability account, during the period, to maximize the net worth, wherein calculating the allocation of the portion of the free cash flow includes: evaluating the plurality of existing accounts subject to conditions on at least one payment made to each of the plurality of existing accounts, wherein the conditions on at least one payment made to each of the plurality of existing accounts, include at least one of minimum payment amount, maximum payment amount, and current payment amount, and regulating the allocation of the free cash flow, during the period, such that the movement of the free cash flow is controlled by: the conditions on at least one payment, the expected change in the value of each asset account, and the expected change in the liability amount of the liability account, wherein the movement results in at least one of: minimizing the liability amount of the at least one liability account, maximizing the value of the at least one asset account during the period, realizing at least one user-defined plan and providing a recommendation to stop funding at least one of the plurality of existing accounts; and
   (g) obtaining a savings output resulting from calculating the allocation of the portion of the free cash flow, the savings being expressed in terms of an amount of money, and displaying the savings output to the user on the interface.

2. The method according to claim 1, wherein the free cash flow portion allocated is 100% of the free cash flow.

3. The method according to claim 1, further including:
   (h) calculating an advisor fee based on the money allocated to the at least one asset and the at least one liability.

4. The method according to claim 3, wherein the advisor fee is calculated as a percentage of the money allocated to the plurality of existing accounts including the at least one asset account and the at least one liability account.

5. The method according to claim 4, wherein the act (f) further comprises optimizing the allocation of the portion of the free cash flow to the at least one asset account and the at least one liability account to optimize the advisor fee.

6. The method according to claim 1, further including:
(g) displaying, to a user, the allocation of money to the plurality of existing accounts including the at least one asset account and the at least one liability account, the display showing the allocation of money according to categories, the categories defined by the user.

7. The method according to claim 1, further comprising:
(i) providing for the user to allocate a portion of the savings to at least one of the at least one asset account, the at least one liability account and at least one user-defined account.

8. The method according to claim 1, wherein the interest rate is variable during the period.

9. The method according to claim 1, wherein the act (f) further comprises optimizing an allocation of money to minimize the expected change in an overall liability amount during the period, the overall liability amount comprising a sum of the liability amounts of all liability accounts.

10. The method according to claim 1, wherein the act (f) further comprises optimizing a fund allocation to minimize the change of the at least one account value during the period.

11. The method according to claim 1, wherein the act (f) further comprises optimizing an allocation of money to maximize an aggregate return over the period, the aggregate return comprising a sum of the values for all assets minus a sum of the liability amounts for all liability accounts.

12. The method according to claim 1, wherein the act (f) further comprises optimizing the allocation to maximize an aggregate return, wherein the aggregate return is defined by a sum of the at least one asset value after the expected change during the period and the at least one liability amount after the expected change during the period.

13. The method according to claim 1, wherein the act (f) further comprises calculating a tax consequence as a result of the allocation.

14. The method according to claim 13, wherein the act (f) further comprises modifying the allocation based on the tax consequence.

15. The method according to claim 14, wherein the act (f) further comprises optimizing the allocation of the portion of the free cash flow to the at least one asset account and the at least one liability account to minimize the tax consequence.

16. The method according to claim 1, wherein at least one liability is provided as a performing debt which includes an equity portion, and wherein the act (f) further comprises planning an allocation to the at least one liability in order to maximize an increase in the equity portion of at least one performing debt during the period.

17. The method according to claim 1, further including calculating the free cash flow as a difference between a current payment and a minimum payment relating to the plurality of existing accounts.

18. The method according to claim 1, wherein the act (f) further comprises displaying the allocation to a user on a graphical user interface.

19. The method according to claim 1, further comprising:
(h) electronically transferring money to the plurality of existing accounts including the at least one asset account and the at least one liability account based on the allocation.

20. The method according to claim 1, wherein the act (f) further comprises optimizing the allocation of the portion of the free cash flow to the at least one asset account and the at least one liability account to minimize liabilities.

21. A system for optimizing an allocation of money to plurality of existing accounts including the at least one asset account and the at least one liability account, wherein each asset account has a value and a projected return rate, the projected return rate comprising a rate at which the value is expected to change over a period, and wherein each liability account has a liability amount and an interest rate, the interest rate comprising a rate at which the liability amount is expected to change over the period, the system comprising:
a user interface that receives an input from a user defining the plurality of existing accounts including the at least one asset account and the at least one liability account and at least one of an income entry and an expense entry;
a processing engine that calculates free cash flow as the difference between all income entries and all expense entries relating to the plurality of existing accounts, and calculates a net worth as the difference between all asset accounts and all liability accounts, the free cash flow and the net worth being expressed in terms of an amount of money, and produces an output by calculating an allocation of a portion of the free cash flow to a plurality of existing accounts including the at least one asset account and the at least one liability account based on the expected change in the value and the expected change in the liability amount during the period and to maximize the net worth, wherein calculating the allocation of the portion of the free cash flow includes:
evaluating the plurality of existing accounts subject to conditions on at least one payment made to each of the plurality of existing accounts, wherein the conditions on at least one payment made to each of the plurality of existing accounts, include at least one of minimum payment amount, maximum payment amount, and current payment amount, and regulating the allocation of the free cash flow, during the period, such that the movement of the free cash flow is controlled by: the conditions on at least one payment, the expected change in the value of each asset account, and the expected change in the liability amount of the liability account, wherein the movement results in at least one of: minimizing the liability amount of the at least one liability account, maximizing the value of the at least one asset account during the period, realizing at least one user-defined plan and providing a recommendation to stop funding at least one of the plurality of existing accounts; and at least one electronic file storage to store the input and the output, wherein the processing engine further produces a saving output resulting from the allocation of the portion of the free cash flow, the savings being expressed in terms of an amount of money and the user interface that displays the savings output to the user.

22. The system according to claim 21, further comprising a data exchange facility which transfers the input from the user interface to the at least one electronic file storage, and transfers the output from the processing engine to the at least one electronic file storage.

23. The system according to claim 21, wherein the processing engine further produces an output allocation to minimize the expected change in the liability amount during the period.

24. The system according to claim 21, wherein the processing engine further produces an output allocation to maximize an aggregate return over the period, the aggregate return comprising a sum of the values for all asset accounts minus a sum of the liability amounts for all liability accounts.

25. The system according to claim 21, wherein the user interface further receives an input defining a tax consequence as a result of the allocation, and wherein the processing engine further produces an output defining a modified allocation based on the tax consequence.

26. The system according to claim 25, wherein the processing engine further produces an output allocation optimizing the portion of the free cash flow to the at least one asset account and the at least one liability account to minimize the tax consequence.

27. The system according to claim 21, wherein the user interface further receives input defining at least one liability as a performing debt including an equity portion, and wherein the processing engine further produces an output defining an allocation in order to maximize an increase of the equity portion of at least one performing debt during the period.

28. The system according to claim 21, further comprising an electronic transfer facility to electronically transfer money to the plurality of existing accounts including the at least one asset account and the at least one liability account based on the allocation.

29. The system according to claim 21, wherein the user interface further receives an input from the user, allocating a portion of the savings to at least one of at least one asset account, the at least one liability account and at least one user-defined account.

30. The system according to claim 21, wherein the free cash flow is further defined as a difference between a current payment and a minimum payment relating to the plurality of existing accounts.

31. The system according to claim 21, wherein the processing engine further produces an output allocation optimizing the portion of the free cash flow to the at least one asset account and the at least one liability account to minimize liabilities.

32. The system according to claim 21, wherein the processing engine further produces an output allocation optimizing the portion of the free cash flow to the at least one asset account and the at least one liability account to optimize an advisor fee.

33. A non-transitory computer-readable medium with instructions recorded thereon, which instructions, when executed, cause at least one processor in a computer system to perform a method comprising acts of:
 (a) providing a user interface to receive input from a user, the input defining at least one of an income entry and an expense entry, and a plurality of existing accounts including at least one asset account and at least one liability account, wherein each asset account has a value and a projected return rate which is a rate at which the value is expected to change during a period, and wherein each liability account has a liability amount and an interest rate defining a rate at which the liability amount is expected to change during the period;
 (b) processing the input to calculate free cash flow as the difference between all income entries and all expense entries, relating to the plurality of existing accounts, and processing the input to calculate a net worth as the difference between all asset accounts and all liability accounts, the and the net worth being expressed in terms of an amount of money, and to produce an output by calculating an allocation of a portion of the free cash flow to the plurality of existing accounts including the at least one asset account and the at least one liability account based on the expected change in the value of the at least one asset account and the expected change in the liability amount for the at least one liability account during the period to maximize the net worth, wherein calculating the allocation of the portion of the free cash flow includes: evaluating the plurality of existing accounts subject to conditions on at least one payment made to each of the plurality of existing accounts, wherein the conditions on at least one payment made to each of the plurality of existing accounts, include at least one of minimum payment amount, maximum payment amount, and current payment amount, and regulating the allocation of the free cash flow, during the period, such that the movement of the free cash flow is controlled by: the conditions on at least one payment, the expected change in the value of each asset account, and the expected change in the liability amount of the liability account, wherein the movement results in at least one of: minimizing the liability amount of the at least one liability account, maximizing the value of the at least one asset account during the period, realizing at least one user-defined plan and providing a recommendation to stop funding at least one of the plurality of existing accounts; (c) displaying the output, on the user interface, to the user, wherein the non-transitory computer-readable medium further comprises instructions defining producing a saving output resulting from the allocation of the portion of the free cash flow the savings being expressed in terms of an amount of money and displaying the savings output to the user on the user interface.

34. The non-transitory computer-readable medium according to claim 33, further comprising instructions defining providing an electronic file storage to store at least one of the input and the output.

35. The non-transitory computer-readable medium according to claim 33, further comprising instructions providing an electronic transfer facility to electronically transfer money to plurality of existing accounts including the at least one asset account and the at least one liability account based on the allocation.

36. The non-transitory computer-readable medium according to claim 33, further comprising instructions providing a data exchange facility which transfers the input from the user interface to the electronic file storage, and transfers the output from the processing engine to the electronic file storage.

37. The non-transitory computer-readable medium according to claim 33, further comprising instructions defining producing an output recommending the allocation to minimize the increase in the liability amount of the at least one liability during the period.

38. The non-transitory computer-readable medium according to claim 33, further comprising instructions defining producing an output fund allocation to minimize the depreciation of the at least one account value during the period.

39. The non-transitory computer-readable medium according to claim 33, further comprising instructions defining producing an output recommending an allocation to maximize an aggregate return, the aggregate return comprising a sum of all values for all assets asset accounts minus a sum of all liability amounts for all liability accounts.

40. The non-transitory computer-readable medium according to claim 33, further comprising instructions defining receiving at least one liability as a performing debt including an equity portion, and producing an output recommending an allocation to maximize an increase in the equity portion of at least one performing debt during the period.

41. The non-transitory computer-readable medium according to claim 33, further comprising instructions defining providing an electronic transfer facility to electronically transfer money to the plurality of existing accounts including the at least one asset account and the at least one liability account based on the allocation.

42. The non-transitory computer-readable medium according to claim 33, further comprising instructions defining processing the input to calculate the free cash flow as a difference between a current payment and a minimum payment relating to the plurality of existing accounts.

43. The non-transitory computer-readable medium according to claim 33, further comprising instructions defining producing an output recommending an allocation the portion of the free cash flow to the at least one asset account and the at least one liability account to minimize liabilities.

44. The non-transitory computer-readable medium according to claim 33, further comprising instructions defining producing an output recommending an allocation the portion of the free cash flow to the at least one asset account and the at least one liability account to optimize an advisor fee.

45. The non-transitory computer-readable medium according to claim 33, further comprising instructions defining producing an output recommending an allocation the portion of the free cash flow to the at least one asset account and the at least one liability account to minimize a tax consequence.

46. The non-transitory computer-readable medium according to claim 33, further comprising instructions defining receiving an input defining an allocation of a portion of the savings output to the at least one asset account, the at least one liability account and at least one user-defined account.

47. A non-transitory computer-readable medium with instructions recorded thereon, which instructions, when executed, cause at least one processor in a computer system to perform a method comprising acts of:
  (a) receiving input, provided by a user via a user interface, defining at least one of an income entry and an expense entry, and a plurality of existing accounts including at least one asset account and at least one liability account, wherein each asset account has a value and a projected return rate defining a rate at which the value is expected to change during a period, and wherein each liability account has a liability amount and an interest rate defining a rate at which the liability amount is expected to change during the period;
  (b) processing the input to calculate free cash flow as the difference between all income entries and all expense entries, relating to the plurality of existing accounts, and processing the input to calculate a net worth as the difference between all asset accounts and all liability accounts, the free cash flow and the net worth being expressed in terms of an amount of money, and to produce an output by calculating an allocation of a portion of the free cash flow to the plurality of existing accounts including the at least one asset account and the at least one liability account based on the expected change in the value of the at least one asset and the expected change in the liability amount of the at least one liability during the period to maximize the net worth wherein calculating the allocation of the portion of the free cash flow includes:
  evaluating the plurality of existing accounts subject to conditions on at least one payment made to each of the plurality of existing accounts, wherein the conditions on at least one payment made to each of the plurality of existing accounts, include at least one of minimum payment amount, maximum payment amount, and current payment amount, and regulating the allocation of the free cash flow, during the period, such that the movement of the free cash flow is controlled by: the conditions on at least one payment, the expected change in the value of each asset account, and the expected change in the liability amount of the liability account, wherein the movement results in at least one of: minimizing the liability amount of the at least one liability account, maximizing the value of the at least one asset account during the period, realizing at least one user-defined plan and providing a recommendation to stop funding at least one of the plurality of existing accounts;
  (c) transmitting the output to the user via the user interface, wherein the non-transitory computer-readable medium further comprises instructions defining producing a savings output resulting from the allocation of the portion of the free cash flow the savings being expressed in terms of an amount of money and transmitting the savings output to the user via the user interface.

48. The non-transitory computer-readable medium according to claim 47, further comprising instructions defining providing an electronic file storage to store at least one of the input and the output.

49. The non-transitory computer-readable medium according to claim 47, further comprising instructions providing an electronic transfer facility to electronically transfer money to plurality of existing accounts including the at least one asset account and the at least one liability account based on the allocation.

50. The non-transitory computer-readable medium according to claim 47, further comprising instructions providing a data exchange facility which transfers the input from the user interface to the electronic file storage, and transfers the output from the processing engine to the electronic file storage.

51. The non-transitory computer-readable medium according to claim 47, further comprising instructions defining producing an output fund allocation to minimize the change of the at least one account value during the period.

52. The non-transitory computer-readable medium according to claim 47, further comprising instructions defining producing an output recommending an allocation to maximize an aggregate return, the aggregate return comprising a sum of the values for all asset accounts minus a sum of the liability amounts for all liability accounts.

53. The non-transitory computer-readable medium according to claim 47, further comprising instructions defining receiving an input defining an allocation of a portion of the savings output to the at least one asset account, the at least one liability account and at least one user-defined account.

54. The non-transitory computer-readable medium according to claim 47, further comprising instructions defining processing the input to calculate the free cash flow as a difference between a current payment and a minimum payment relating to the plurality of existing accounts.

55. The non-transitory computer-readable medium according to claim 47, further comprising instructions defining producing an output recommending an allocation the portion of the free cash flow to the at least one asset account and the at least one liability account to minimize liabilities.

56. The non-transitory computer-readable medium according to claim 47, further comprising instructions defining producing an output recommending an allocation the portion of the free cash flow to the at least one asset account and the at least one liability account to optimize an advisor fee.

57. The non-transitory computer-readable medium according to claim 47, further comprising instructions defining producing an output recommending an allocation the portion of the free cash flow to the at least one asset account and the at least one liability account to minimize a tax consequence.

* * * * *